United States Patent
Zheng et al.

(10) Patent No.: US 11,251,863 B2
(45) Date of Patent: *Feb. 15, 2022

(54) PROTECTION SWITCHING METHOD AND NODE

(71) Applicant: HUAWEI TECHNOLOGIES CO., LTD., Guangdong (CN)

(72) Inventors: Haomian Zheng, Dongguan (CN); Yu Zheng, Dongguan (CN); Italo Busi, Segrate (IT); Qinfen Tan, Dongguan (CN); Qingcong Lu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,687

(22) Filed: Jul. 10, 2020

(65) Prior Publication Data
US 2020/0343971 A1 Oct. 29, 2020

Related U.S. Application Data

(63) Continuation of application No. 16/360,379, filed on Mar. 21, 2019, now Pat. No. 10,735,090, which is a
(Continued)

(51) Int. Cl.
*H04B 10/00* (2013.01)
*H04B 10/038* (2013.01)
(Continued)

(52) U.S. Cl.
CPC ....... *H04B 10/038* (2013.01); *H04B 10/0771* (2013.01); *H04J 3/14* (2013.01);
(Continued)

(58) Field of Classification Search
CPC ............... H04B 10/032; H04B 10/038; H04B 10/0771; H04J 2203/006; H04J 14/0295;
(Continued)

(56) References Cited

U.S. PATENT DOCUMENTS

| 5,717,796 A | 2/1998 | Clendening |
| 7,443,789 B2 | 10/2008 | Glaser et al. |

(Continued)

FOREIGN PATENT DOCUMENTS

| CN | 102136865 A | 7/2011 |
| CN | 103098416 A | 5/2013 |

(Continued)

OTHER PUBLICATIONS

Extended European Search Report issued in European Application No. 16916455.5 dated May 13, 2019, 9 pages.
(Continued)

*Primary Examiner* — Hibret A Woldekidan
(74) *Attorney, Agent, or Firm* — Fish & Richardson P.C.

(57) ABSTRACT

The present disclosure discloses a protection switching method and a node. The method can include: receiving, by an intermediate node, a first protection switching request message sent by an upstream neighboring node, where the first protection switching request message is used to request to activate a first protection path, and the intermediate node is a node on the first protection path; determining, by the intermediate node, that the first protection path needs to occupy N1 timeslots, and selecting N1 timeslots for the first protection path from N2 available timeslots in a preset order; and sending, by the intermediate node, a second protection switching request message to the downstream neighboring node, where the second protection switching request message is used to request the downstream neighboring node to complete a cross-connection, on the first protection path, between the downstream neighboring node and the intermediate node based on the first group of timeslots.

18 Claims, 7 Drawing Sheets

Related U.S. Application Data continuation of application No. PCT/CN2016/099602, filed on Sep. 21, 2016.

(51) Int. Cl.
*H04L 12/10* (2006.01)
*H04J 3/14* (2006.01)
*H04B 10/077* (2013.01)

(52) U.S. Cl.
CPC ........ *H04L 12/10* (2013.01); *H04J 2203/006* (2013.01); *Y02D 30/50* (2020.08)

(58) Field of Classification Search
CPC ....... H04J 14/08; H04J 14/0287; H04L 45/28; H04L 45/22; H04L 12/10; H04Q 2011/0081; H04Q 2213/1301; H04Q 2213/13166; H04Q 2213/1316; Y02D 30/50
USPC ...................... 398/1–6, 8, 45, 46, 47, 50, 52
See application file for complete search history.

(56) References Cited

U.S. PATENT DOCUMENTS

| | | | |
|---|---|---|---|
| 7,451,340 | B2 | 11/2008 | Doshi et al. |
| 7,529,183 | B2 | 5/2009 | Huck |
| 8,078,051 | B2 | 12/2011 | Arena |
| 8,116,196 | B2 | 2/2012 | Trudel et al. |
| 8,787,750 | B2 | 7/2014 | Zi |
| 8,867,333 | B2 | 10/2014 | Doshi et al. |
| 9,100,117 | B2 | 8/2015 | Miyabe |
| 9,369,409 | B2 | 6/2016 | Hu et al. |
| 10,056,973 | B2 | 8/2018 | Syed et al. |
| 2002/0064166 | A1 | 5/2002 | Suetsugu et al. |
| 2004/0202467 | A1 | 10/2004 | Luft et al. |
| 2012/0163803 | A1* | 6/2012 | Zi .............................. H04J 3/14 398/17 |
| 2013/0071117 | A1 | 3/2013 | Pan et al. |
| 2014/0161437 | A1 | 6/2014 | Miyabe |
| 2015/0186216 | A1 | 7/2015 | Lee |
| 2015/0334004 | A1 | 11/2015 | Hussain et al. |
| 2016/0020850 | A1 | 1/2016 | Youn et al. |
| 2016/0036521 | A1 | 2/2016 | Miyabe et al. |
| 2018/0041423 | A1 | 2/2018 | He et al. |
| 2018/0324505 | A1 | 11/2018 | Zheng |

FOREIGN PATENT DOCUMENTS

| | | | | |
|---|---|---|---|---|
| CN | 103534961 | A | 1/2014 | |
| CN | 105656542 | A | 6/2016 | |
| EP | 2919405 | A1 * | 9/2015 | ............... H04L 1/22 |
| EP | 2919405 | A1 | 9/2015 | |
| EP | 2953299 | | 12/2015 | |
| EP | 2953294 | B1 | 3/2017 | |
| WO | WO-9736400 | A1 * | 10/1997 | ......... H04L 12/2852 |
| WO | 2015165033 | A1 | 11/2015 | |

OTHER PUBLICATIONS

Huawei Technologies et al, Discussion on APS of Shared Mesh Protection;C 1082', ITU-T Draft;Study Period 2009-2012, International Telecommunication Union, Geneva:CH, vol. 9/15, May 21, 2010, pp. 1-11, XP017447774.

International Search Report and Written Opinion issued in International Application No. PCT/CN2016/099602 dated Apr. 28, 2017, 21 pages.

Office Action issued in Chinese Application No. 201680086079.1 dated May 8, 2021, 6 pages (with English translation).

* cited by examiner

PROTECTION SWITCHING METHOD AND NODE

CROSS-REFERENCE TO RELATED APPLICATIONS

This application is a continuation of U.S. patent application Ser. No. 16/360,379, filed on Mar. 21, 2019, which is a continuation of International Application No. PCT/CN2016/099602, filed on Sep. 21, 2016. All of the afore-mentioned patent applications are hereby incorporated by reference in their entireties.

TECHNICAL FIELD

The present disclosure relates to the field of communications technologies, and in particular, to a protection switching method and a node.

BACKGROUND

In a service transmission process in a communications network, when a fault occurs in an active path on which a service is transmitted, protection switching needs to be performed. To be specific, the service on the faulty path is switched to a protection path and transmitted, thereby ensuring reliability of service transmission.

The reliability may be implemented by different protection and restoration technologies, for example, 1+1 protection. In an optical network, two paths are provided for transmission of each service. One path is selected as an active path from the two paths based on signal quality of the two paths, and the other path is a protection path. When the active path is faulty, the protection path may be used. Therefore, transmission of each service requires double bandwidth resources of the optical network, and resource utilization is relatively low. To improve resource utilization, a shared mesh protection (SMP) technology emerges. The technology allows a same timeslot resource to be shared by protection paths of a plurality of services.

FIG. 1 is a schematic diagram of an SMP network topology. S1 and S2 are two active paths that are A-B and C-D respectively. P1 is a protection path of S1, and the protection path is A-E-F-G-B. P2 is a protection path of S2, and the protection path is C-E-F-G-D. A shared protection path of S1 and S2 is E-F-G. S1 is an active path of a service W1, and P1 is a protection path of the service W1. S2 is an active path of a service W2, and P2 is a protection path of the service W2. When the active path S1 is faulty, one of end nodes senses the fault and initiates switching. It is assumed that a node A initiates a protection switching process. The node A transfers a protection switching request message hop by hop along nodes on the protection path P1. When receiving the protection switching request message and determining that a timeslot resource is available, each node on the protection path P sends the protection switching request message downstream and cross-connection of the node is established. When the protection switching request message is transferred to a node B on the protection path P1 and cross-connection establishment is completed, cross-connection establishment of all of the nodes on the protection path P1 is completed, and protection switching is completed.

A limitation of the foregoing protection switching manner is that, a timeslot resource corresponding to an active path is designated during service configuration. To be specific, when no fault occurs, protection switching resources to be used are specified. For example, P1 uses a timeslot 1, and P2 uses a timeslot 2. For example, it is assumed that a shared optical transport network (OTN) link includes eight timeslot resources in total used to protect 16 services that are a service W1, a service W2, . . . , and a service W16 respectively, and each timeslot is used to protect two services. The numbers of protection paths respectively corresponding to the 16 services are P1, P2, . . . , and P16, and a corresponding timeslot rule is that P1 and P2 share a timeslot 1. P3 and P4 share a timeslot 2, and the rest can be deduced by analogy.

The service W1 uses P1 as a protection path, the service W2 uses P2 as a protection path, and P1 and P2 share the timeslot 1. Therefore, when the service W1 and the service W2 are faulty simultaneously, one of the services may occupy the timeslot 1 to perform protection, and the other service is forcibly interrupted. Seven idle timeslots still exist on the OTN link, but cannot be used to protect the interrupted service. In this case, flexibility of timeslot resource configuration in the prior art is insufficient, and timeslot resources are not fully used, causing low efficiency of protection switching.

SUMMARY

Embodiments of the present invention provide a protection switching method and a node, to improve timeslot resource utilization, and further improve protection switching efficiency.

According to a first aspect, an embodiment of the present invention provides a protection switching method, including: receiving, by an intermediate node, a first protection switching request message sent by an upstream neighboring node of the intermediate node, where the first protection switching request message is used to request to activate a first protection path, and herein the first protection path includes a first end node, a second end node, and at least one intermediate node; determining, by the intermediate node, that the first protection path needs to occupy N1 timeslots, and selecting a first group of timeslots for the first protection path from N2 available timeslots in a preset order, where a timeslot quantity of the first group of timeslots is N1, the N2 available timeslots are available timeslots included in a link between the intermediate node and a downstream neighboring node of the intermediate node, and N2 is greater than or equal to N1; and sending, by the intermediate node, a second protection switching request message to the downstream neighboring node of the intermediate node, where the second protection switching request message is used to request the downstream neighboring node to complete a cross-connection, on the first protection path, between the downstream neighboring node and the intermediate node based on the first group of timeslots.

In this embodiment of the present invention, the intermediate node allocates an available timeslot to the first protection path from the available timeslots in the preset order, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

With reference to the first aspect, in a first implementation of the first aspect, the selecting, by the intermediate node, a timeslot used for the first protection path between the intermediate node and the upstream neighboring node is described. After the intermediate node receives the first protection switching request message sent by the upstream neighboring node, the intermediate node selects a second group of timeslots for the first protection path from N3 available timeslots. A timeslot quantity of the second group of timeslots is N1, the N3 available timeslots are available timeslots included in a link between the intermediate node and the upstream neighboring node of the intermediate node, and N3 is greater than or equal to N1. The intermediate node sends a third protection switching request message to the upstream neighboring node of the intermediate node, where the third protection switching request message is used to request the upstream neighboring node to complete a cross-connection, on the first protection path, between the upstream neighboring node and the intermediate node based on the second group of timeslots.

In this embodiment of the present invention, the intermediate node may select a timeslot used for the first protection path between the intermediate node and the upstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

With reference to the first aspect, in a second implementation of the first aspect, the first protection switching request message is used to request the intermediate node to complete a cross-connection, on the first protection path, between the intermediate node and the upstream neighboring node of the intermediate node based on a second group of timeslots. The second group of timeslots are available timeslots selected by the upstream neighboring node for the first protection path from N3 available timeslots in a preset order, a timeslot quantity of the second group of timeslots is N1, the N3 available timeslots are available timeslots included in a link between the intermediate node and the upstream neighboring node, and N3 is greater than or equal to N1.

In this embodiment of the present invention, the upstream neighboring node of the intermediate node may select a timeslot used for the first protection path between the intermediate node and the upstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

With reference to the first or second implementation of the first aspect, in a third implementation of the first aspect, a process in which the intermediate node completes a cross-connection is described. The intermediate node completes the cross-connection between the intermediate node and the downstream neighboring node based on the first group of timeslots and completes the cross-connection between the intermediate node and the upstream neighboring node based on the second group of timeslots.

With reference to the first aspect, or any one of the first to third implementations of the first aspect, in a fourth implementation of the first aspect, a process in which the intermediate node selects the first group of timeslots for the first protection path from the N2 available timeslots in the preset order is described in detail. If the intermediate node is a first preset type of node relative to the downstream neighboring node of the intermediate node, the intermediate node selects the first group of timeslots for the first protection path from the N2 available timeslots in a first preset order; or if the intermediate node is a second preset type of node relative to the downstream neighboring node of the intermediate node, the intermediate node selects the first group of timeslots for the first protection path from the N2 available timeslots in a second preset order. The first preset order is different from the second preset order.

In this embodiment of the present invention, because node types are different, neighboring nodes select timeslots in different orders. When each of a plurality of active paths sharing a same timeslot resource is faulty, a same timeslot is prevented from being allocated to the plurality of active paths, and therefore an erroneous service connection may be prevented from occurring in a protection switching process.

With reference to the first aspect, or any one of the first to fourth implementations of the first aspect, in a fifth implementation of the first aspect, the foregoing first group of timeslots are not selected by the intermediate node, but instead selected by the downstream neighboring node of the intermediate node. A process in which the downstream neighboring node of the intermediate node selects the first group of timeslots is described. After the intermediate node receives the first protection switching request message sent by the upstream neighboring node, the intermediate node sends a fourth protection switching request message to the downstream neighboring node of the intermediate node, where the fourth protection switching request message is used to request to activate the first protection path. The intermediate node receives a fifth protection switching request message sent by the downstream neighboring node, where the fifth protection switching request message is used to request the intermediate node to complete a cross-connection, on the first protection path, between the intermediate node and the downstream neighboring node based on the first group of timeslots. The first group of timeslots are selected by the downstream neighboring node of the intermediate node for the first protection path from the N2 available timeslots, and the N2 available timeslots are the available timeslots included in the link between the intermediate node and the downstream neighboring node.

In this embodiment of the present invention, the downstream neighboring node of the intermediate node may select a timeslot used for the first protection path between the intermediate node and the downstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

With reference to the first aspect, or any one of the first to fifth implementations of the first aspect, in a sixth implementation of the first aspect, the sending, by the intermediate node, a second protection switching request message is described. The intermediate node sends the second protection switching request message to the downstream neighboring node by using an overhead byte in an optical network.

With reference to the first implementation of the first aspect, in a seventh implementation of the first aspect, the sending, by the intermediate node, a third protection switching request message is described. The intermediate node sends the third protection switching request message to the upstream neighboring node by using an overhead byte in an optical network.

With reference to the fifth implementation of the first aspect, in an eighth implementation of the first aspect, the sending, by the intermediate node, a fourth protection switching request message is described. The intermediate node sends the fourth protection switching request message to the downstream neighboring node by using an overhead byte in an optical network.

According to a second aspect, an embodiment of the present invention provides a protection switching method, including: when a first active path between a first end node and a second end node is faulty, determining, by the first end node, that a first protection path needs to occupy N1 timeslots, and selecting a second group of timeslots for the first protection path from N3 available timeslots in a preset order, where the first protection path is a protection path of the first active path, the first protection path includes the first end node, the second end node, and at least one intermediate node, a timeslot quantity of the second group of timeslots is N1, the N3 available timeslots are available timeslots included in a link between the first end node and a downstream neighboring node of the first end node, the downstream neighboring node of the first end node is an intermediate node on the first protection path, and N3 is greater than or equal to N1; and sending, by the first end node, a first protection switching request message to the downstream neighboring node of the first end node, where the first protection switching request message is used to request the downstream neighboring node to complete a cross-connection, on the first protection path, between the downstream neighboring node and the first end node based on the second group of timeslots.

In this embodiment of the present invention, the first end node may select a timeslot used for the first protection path between the first end node and the downstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

With reference to the second aspect, in a first implementation of the second aspect, a process in which the first end node completes a cross-connection is described. After selecting the second group of timeslots for the first protection path from the N3 available timeslots in the preset order, the first end node completes the cross-connection between the first end node and the downstream neighboring node based on the second group of timeslots.

With reference to the second aspect or the first implementation of the second aspect, in a second implementation of the second aspect, a process in which the first end node selects the second group of timeslots for the first protection path from the N3 available timeslots in the preset order is described in detail. If the first end node is a first preset type of node relative to the downstream neighboring node of the first end node, the first end node selects the second group of timeslots for the first protection path from the N3 available timeslots in a first preset order; or if the first end node is a second preset type of node relative to the downstream neighboring node of the first end node, the first end node selects the second group of timeslots for the first protection path from the N3 available timeslots in a second preset order. The first preset order is different from the second preset order.

In this embodiment of the present invention, because node types are different, neighboring nodes select timeslots in different orders. When each of a plurality of active paths sharing a same timeslot resource is faulty, a same timeslot is prevented from being allocated to the plurality of active paths, and therefore an erroneous service connection may be prevented from occurring in a protection switching process.

With reference to the second aspect or the first or second implementation of the second aspect, in a third implementation of the first aspect, the sending, by the first end node, a first protection switching request message to the downstream neighboring node of the first end node is described. The first end node sends the first protection switching request message to the downstream neighboring node by using an overhead byte in an optical network.

According to a third aspect, an embodiment of the present invention provides a protection switching method, including: receiving, by a second end node, a fourth protection switching request message sent by an upstream neighboring node of the second end node, where the fourth protection switching request message is used to request to activate a first protection path, and herein the first protection path includes a first end node, the second end node, and at least one intermediate node; determining, by the second end node, that the first protection path needs to occupy N1 timeslots, and selecting a first group of timeslots for the first protection path from N2 available timeslots, where a timeslot quantity of the first group of timeslots is N1, the N2 available timeslots are available timeslots included in a link between the second end node and the upstream neighboring node of the second end node, and N2 is greater than or equal to N1; and sending, by the second end node, a fifth protection switching request message to the upstream neighboring node, where the fifth protection switching request message is used to request the upstream neighboring node to complete a cross-connection, on the first protection path, between the upstream neighboring node and the second end node based on the first group of timeslots.

In this embodiment of the present invention, the second end node may select a timeslot used for the first protection path between the second end node and the upstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

With reference to the third aspect, in a first implementation of the third aspect, the sending, by the second end node, a fifth protection switching request message is described. The second end node sends the fifth protection switching request message to the upstream neighboring node by using an overhead byte in an optical network.

With reference to the third aspect or the first implementation of the third aspect, in a second implementation of the third aspect, a process in which the second end node completes a cross-connection is described. After selecting the first group of timeslots for the first protection path from the N2 available timeslots, the second end node completes the cross-connection between the second end node and the upstream neighboring node based on the first group of timeslots.

With reference to the third aspect, in a third implementation of the third aspect, the foregoing first group of timeslots are not selected by the second end node, but instead selected by the upstream neighboring node of the second end node. A process in which the upstream neighboring node of the second end node selects the first group of timeslots is described. The second end node receives a second protection switching request message sent by the upstream neighboring node. The second protection switching request message is used to request the second end node to complete a cross-connection, on the first protection path, between the downstream neighboring node and the intermediate node based on the first group of timeslots. The first group of timeslots are available timeslots selected by the upstream neighboring node for the first protection path from the N2 available timeslots, a timeslot quantity of the first group of timeslots is N1, and the N2 available timeslots are available timeslots included in a link between the intermediate node and the downstream neighboring node of the intermediate node. The second end node completes the cross-connection between the second end node and the upstream neighboring node based on the second protection switching request message and the first group of timeslots.

In this embodiment of the present invention, the upstream neighboring node of the second end node may select a timeslot used for the first protection path between the second end node and the upstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

According to a fourth aspect, an embodiment of the present invention provides a network node, including a module or a unit configured to perform the protection switching method according to the first aspect or any implementation of the first aspect.

According to a fifth aspect, an embodiment of the present invention provides a network node, including a module or a unit configured to perform the protection switching method according to the second aspect or any implementation of the second aspect.

According to a sixth aspect, an embodiment of the present invention provides a network node, including a module or a unit configured to perform the protection switching method according to the third aspect or any implementation of the third aspect.

According to a seventh aspect, the present invention provides a network node, including a processor and a memory, where the memory is configured to store an instruction, and the processor is configured to invoke the instruction in the memory to perform the method according to the first aspect and any possible implementation of the first aspect, the method according to the second aspect and any possible implementation of the second aspect, and the method according to the third aspect and any possible implementation of the third aspect.

According to an eighth aspect, an embodiment of the present invention provides a network system, including: the node according to the fourth aspect and any possible implementation of the fourth aspect, and the node according to the fifth aspect and any possible implementation of the fifth aspect.

According to a ninth aspect, an embodiment of the present invention provides a network system, including: the node according to the fourth aspect and any possible implementation of the fourth aspect, and the node according to the sixth aspect and any possible implementation of the sixth aspect.

Based on the technical solutions provided in the present invention, the foregoing first preset order is a descending order of timeslot numbers, and the foregoing second preset order is an ascending order of the timeslot numbers. Because node types are different, neighboring nodes select timeslots in reverse orders. When each of a plurality of active paths sharing a same timeslot resource is faulty, a same timeslot is prevented from being allocated to the plurality of active paths, and therefore an erroneous service connection may be prevented from occurring in a protection switching process.

The technical solutions provided in the present invention may be applied to a network having an SMP network topology. When a same timeslot resource is shared by at least two protection paths, a timeslot may be dynamically allocated by using a node on a protection path, thereby improving network resource utilization and improving protection switching efficiency.

BRIEF DESCRIPTION OF DRAWINGS

To describe the technical solutions in the embodiments of the present invention more clearly, the accompanying drawings required in the embodiments are briefly described below. The accompanying drawings described below are some embodiments of the present invention.

DESCRIPTION OF EMBODIMENTS

Terms used in implementation parts of the present invention are intended to only explain specific embodiments of the present invention, but not intended to limit the present invention. The following clearly describes the technical solutions in the embodiments of the present invention with reference to the accompanying drawings in the embodiments of the present invention.

The technical solutions according to the embodiments of the present invention may be applied to a network having a quasi-SMP network topology, for example, a synchronous digital hierarchy (SDH) network, a wavelength division multiplexing (WDM) network, an OTN optical network, the Ethernet (Ethernet), and the Flex Ethernet (FlexE). In the embodiments of the present invention, a description is given by using the OTN optical network as an example.

It should be noted that, in SMP, different link granularities are defined for different OTN links, and a smallest link granularity is optical channel transport unit (OTU) 0 that has a bandwidth of 1.25 G and includes one timeslot resource. Other link granularities include but are not limited to: OTU1, OTU2, OTU3, and OTU4 that have bandwidths of 2.5 G, 10 G, 40 G, and 100 G respectively and include 2, 8, 32, and 80 timeslot resources respectively. Service granularities of services that may be transferred on links having different link granularities are also different, and a smallest service granularity is optical channel data unit (ODU) 0 that has a bandwidth of 1.25 G and occupies one timeslot resource. Other service granularities include but are not limited to: ODU1, ODU2, ODU3, and ODU4 that have bandwidths of 2.5 G, 10 G, 40 G. and 100 G respectively and occupy 2, 8, 32, and 80 timeslot resources respectively. It should be noted that a granularity of a link needs to be greater than or equal to a granularity of a service transferred on the link. For example, an OTU2 link may be used to protect an ODU0 service and may be further used to protect an ODU1 service or an ODU2 service.

Moreover, in the embodiments of the present invention, two protection switching request messages are mainly used, a first protection switching request message is a signal failure (SF) message, and a second protection switching request message is a reverse request (RR) message. SF is used in a scenario in which an active path is fault) and a service is switched from the active path to a protection path; and RR is a response message for the SF message. To reduce a protection switching time, a protection switching request message may be transferred by using automatic protection switching (APS) overheads, thereby implementing protection switching of an entire service. Specifically, in the following embodiments of the present invention, a first protection switching request message and a second protection switching request message may be SF messages, and a third protection switching request message and a fourth protection switching request message may be RR messages.

Figure 1:
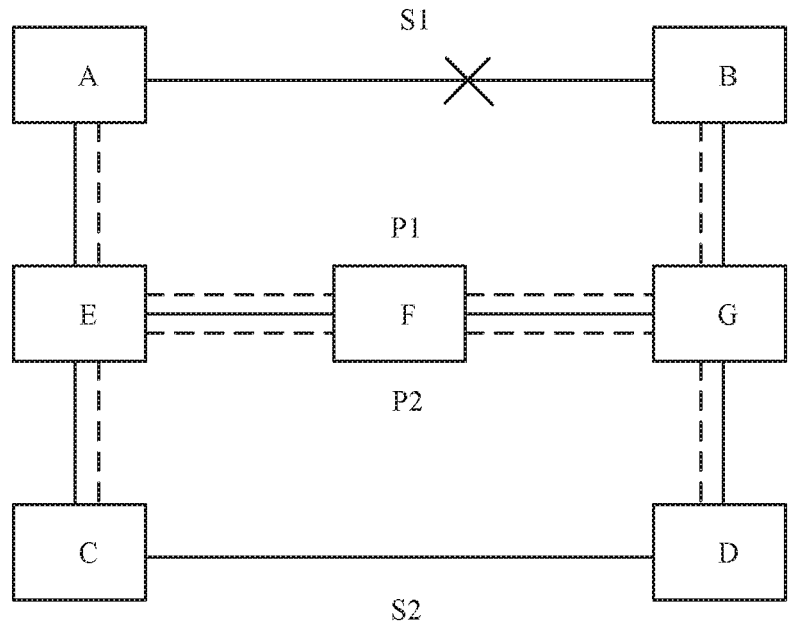
FIG. 1 is a schematic diagram of an SMP network topology.
Figure 2:
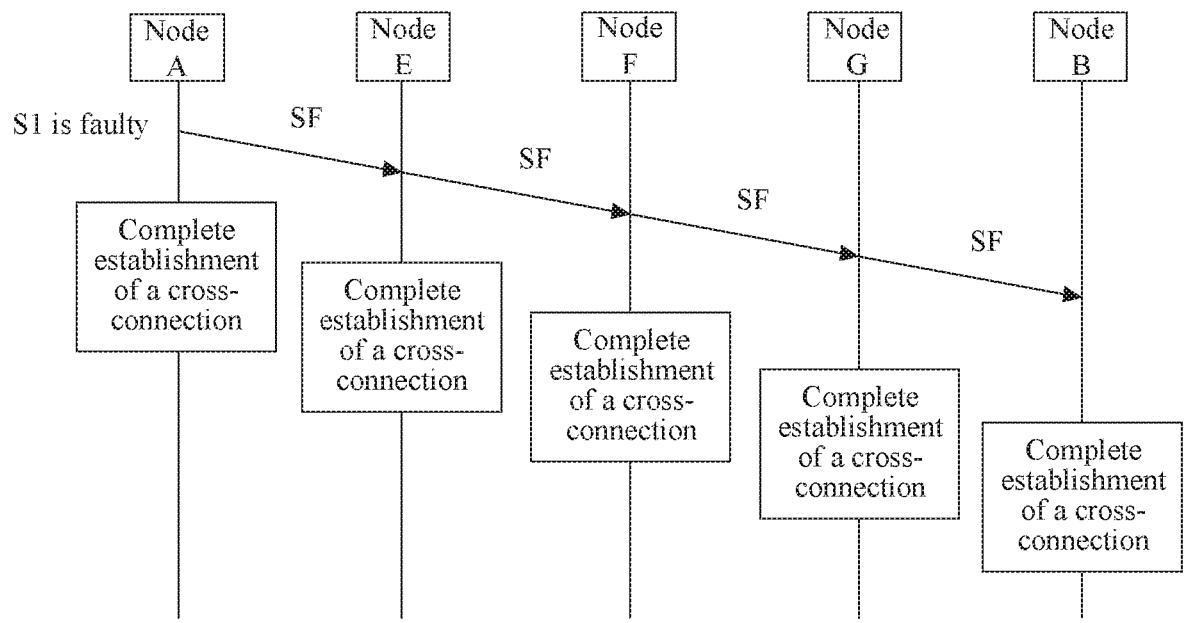
FIG. 2 is a signaling flowchart of protection switching according to an embodiment of the present invention.
Figure 3:
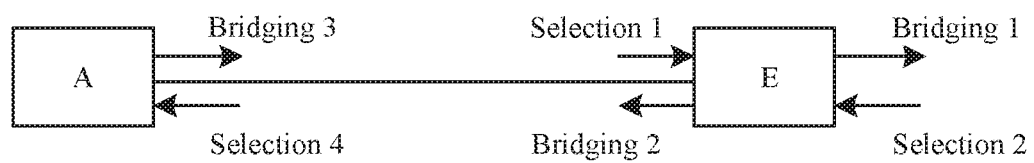
FIG. 3 is a schematic structural diagram of a connection between a node A and a node E according to an embodiment of the present invention.

FIG. 2 is a signaling flowchart of protection switching according to an embodiment of the present invention. As shown in FIG. 2, in the network topology shown in FIG. 1, when it is detected that S1 is faulty, a protection path P1; A-E-F-G-B of S1 needs to be activated. In a process of activating the protection path of S1, a node processing process is related to a process of establishing a cross-connection, cross-connection establishment includes two actions, namely, bridging establishment and selection establishment, and the completion of cross-connection establishment is the completion of two processes, namely, bridging and selection. Specifically, bridging indicates that a node is activated to send data, and selection indicates that a node is activated to receive data. As shown in FIG. 3, for an intermediate node E, each of bridging and selection is in two directions, bridging 1 and bridging 2 indicate that data is sent in the two directions respectively, and selection 1 and selection 2 indicate that data is received in the two directions respectively. Bridging 1 and selection 1 indicate data transmission in one direction, and bridging 2 and selection 2 indicate data transmission in the other direction. For an end node A, each of bridging and selection is in only one direction, and bridging and selection are in opposite directions. For example, bridging from E to A is established on the node E. To be specific, bridging 2 is established on the node E, and is used to send data to the node A. Selection from A to E is established on the node E. To be specific, selection 1 is established on the node E, and is used to receive data from the node A.

A signaling transmission direction may be from a source node to a sink node, or may be from a sink node to a source node. An upstream direction and a downstream direction are relative, any direction may be used as an upstream direction, and the other direction is used as a downstream direction. In this embodiment of the present invention, description is given by using an example in which the node A is a source node of S1 and P1 and a node B is a sink node of S1 and P1. In S1 or P1, a direction from the node A to the node B is a downstream direction, and a direction from the node B to the node A is an upstream direction. Moreover, in the present invention, a first end node (or a second end node) may be either of two end nodes on a first protection path, that is, may be a source node or may be a sink node, and this is not limited in this embodiment of the present invention. For convenience of description, in the present invention a transmission direction of a protection switching request message is used as a reference direction. To be specific, an intermediate node, an upstream neighboring node of the intermediate node, and a downstream neighboring node of the intermediate node are described in a relative manner.

Specifically, it is assumed that each of shared protection paths E-F and F-G is an OTU2 link. After detecting that S1 is faulty, the source node A of P determines, based on configuration information of the node A, that P1 uses a timeslot 1. If the node A determines that the timeslot 1 is available, the node A uses the timeslot 1 to complete a cross-connection between the node A and the downstream neighboring node E, and sends an SF message to the downstream neighboring node E. That the timeslot is available includes that the timeslot 1 is idle, that is, is not occupied by another service, or the timeslot 1 is occupied by a service having a low priority. Herein, the configuration information of the node A may be, for example, shown in Table 1.

TABLE 1

| 1. Configuration information of the node A |||||| 
|---|---|---|---|---|---|
| Service ID | Protection-path ID | Priority | Downstream neighboring node | Service granularity | Used timeslot |
| WI | P1 | 1 | E | ODU0 | timeslot 1 |

Optionally, the configuration information of the node A may further include an active-path ID (Identifier), for example, S1.

It should be noted that, because the node A is an end node, only one neighboring node needs to be configured. The service ID is an identifier of a service, and the protection-path ID is an identifier of a protection path.

After receiving the SF message from the node A, the node E determines, based on configuration information of the node E, that P1 uses the timeslot 1 between the node E and the node A. If the node E determines that the timeslot 1 is available, the node E uses the timeslot 1 to complete a cross-connection between the node E and the node A. Moreover, the node E determines, based on the configuration information of the node E, that P1 uses a timeslot 2 between the node E and a node F. If the node E determines that the timeslot 2 is available, the node E uses the timeslot 2 to complete a cross-connection between the node E and the node F, and sends an SF message to the downstream neighboring node F. The configuration information of the node E may be, for example, shown in Table 2.

TABLE 2

2. Configuration information of the node E

| Protection-path ID | Priority | Service granularity | Upstream neighboring node | Timeslot used by the node E and the upstream neighboring node | Downstream neighboring node | Timeslot used by the node E and the downstream neighboring node |
|---|---|---|---|---|---|---|
| P1 | 1 | ODU0 | A | timeslot 1 | F | timeslot 2 |
| P2 | 2 | ODU0 | C | timeslot 1 | F | timestot 2 |
| ... | ... | ... | ... | ... | ... | ... |

It should be noted that, because the node E is an intermediate node, two neighboring nodes need to be configured. It can be learned from Table 2 that, between the node A and the node E, P1 uses the timeslot 1; and between the node E and the node F, P1 uses the timeslot 2. Moreover, because the node E is a node shared by a protection path P1 and a protection path P2, P1 and P2 need to be configured separately. The configuration information of the intermediate node E shown in Table 2 includes a priority of a protection path. For example, a priority of a protection path of a service W1 is 1 and a priority of a protection path of a service W2 is 2. In the table, a priority is indicated by using a digit, and a smaller digit indicates a higher priority.

Processing processes and node configuration manners of the node F and a node G are similar to those of the node E. and details are not described herein again.

After receiving the SF message, the sink node B of P1 determines, based on configuration information of the node B, that P1 uses the timeslot 2. If the node B determines that the timeslot 2 is available, the node B uses the timeslot 2 to complete establishment of a cross-connection between the node B and the node G. In this case, protection switching of P1 is completed. To be specific, the service W1 is switched from the active path S1 to the protection path P1. The configuration information of the node B may be, for example, shown in Table 3.

TABLE 3

3. Configuration information of the node B

| Service ID | Protection-path ID | Priority | Upstream neighboring node | Service granularity | Used timeslot |
|---|---|---|---|---|---|
| W1 | P1 | 1 | G | ODU0 | timeslot 2 |

Optionally, the configuration information of the node B may further include an active-path ID, for example, S1.

It should be noted that, because the node B is an end node, only one neighboring node needs to be configured.

Optionally, a cross-connection of each node may be further completed after the node receives an RR message from a downstream neighboring node. Description is given by using a link segment A-E as an example. After determining that the timeslot 1 is available, the node A performs the following actions: (1) sending an SF message to the downstream neighboring node E; and (2) using the timeslot 1 to complete bridging of the node A in a direction relative to E, for example, bridging 3 shown in FIG. 3. In this case, step 2 may be performed or may not be performed. If step 2 is performed, an order of performing step 1 and step 2 is not limited. After receiving the RR message sent by the node E, the node A completes the following actions: (3) using the timeslot 1 to complete selection of the node A in a direction relative to the node E, for example, selection 4 shown in FIG. 3; and (4) performing step 2 if step 2 is not performed previously, that is, using the timeslot 1 to complete bridging of the node A in the direction relative to the node E. An order of performing step 3 and step 4 is not limited. A difference between this implementation and a previous implementation is that the downstream neighboring node E needs to reply with an RR message, cross-connection of the node A is completed after the node A receives the RR message from the downstream neighboring node E. Compared with the previous implementation, this implementation may prevent an erroneous connection from occurring, thereby improving protection switching reliability. For example, the service W1 is performed on the protection path P1 of the service W1. In this case, when the service W2 is faulty, if a service protection priority of P2 is higher than that of P1, the service W2 is switched to P2, and P2 uses an E-F-G segment resource shared by P1 and P2. Assuming that the protection switching process is initiated by a node C, when the node C and the node E complete cross-connection establishment and SF is transferred by the node C to the node E, cross-connection of C-E-F-G-B exists in a network, and an erroneous connection is established. This situation is referred to as an erroneous connection that is a situation not allowed to occur in SMP. A process in which another node completes a cross-connection between the another node and a downstream neighboring node is similar to that for the node A, and details are not described herein again.

Then, when it is detected that S2 is faulty, a protection path P2: C-E-F-G-D of S2 needs to be activated. It is assumed that a protection switching process of P2 is initiated by the node C. When receiving an SF message from the node C, the node E determines, based on the configuration information of the node E, that P2 uses the timeslot 2 between the node E and the node F. Because both P1 and P2 use the timeslot 2, a priority of P1 is higher than a priority of P2, and P2 cannot preempt a timeslot resource of the shared protection path E-F, the service W2 is forcibly interrupted. In this case, seven idle timeslots still exist on the OTU2 link, but cannot be used to protect the interrupted service W2, and timeslot resources are not fully used.

For the problem existing in the prior art, in a network having an SMP network topology, when a same timeslot resource is shared by at least two protection paths, a timeslot may be dynamically allocated by using a node on a protection path, thereby improving network resource utilization and improving protection switching efficiency. For example, for the shared protection link E-F, when the active path S1 is faulty and the node E receives an SF message sent by the upstream neighboring node A, if eight available timeslots exist between the node E and the node F, the node E allocates a timeslot 8 having a largest number to P1. In this case, if the active path S2 also is faulty, when the node E receives an SF message sent by the upstream neighboring node A, the node E allocates a timeslot 1 having a smallest number to P2, thereby improving timeslot resource utilization.

Figure 4:
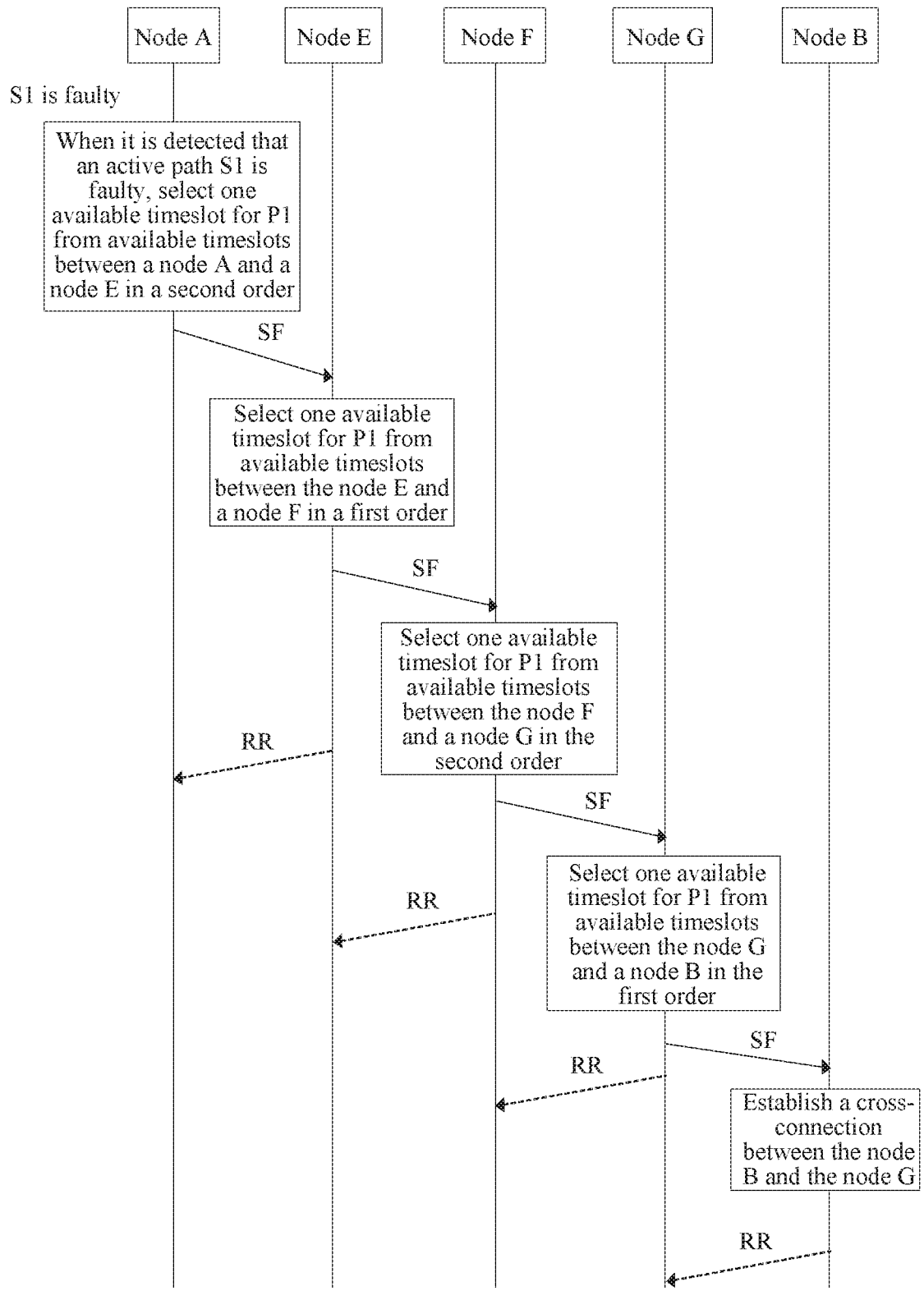
FIG. 4 is a signaling flowchart of a protection switching method according to an embodiment of the present invention.

FIG. 4 is a signaling flowchart of a protection switching method according to an embodiment of the present invention. This process is described for the topology shown in FIG. 1.

Figures 5, 6:
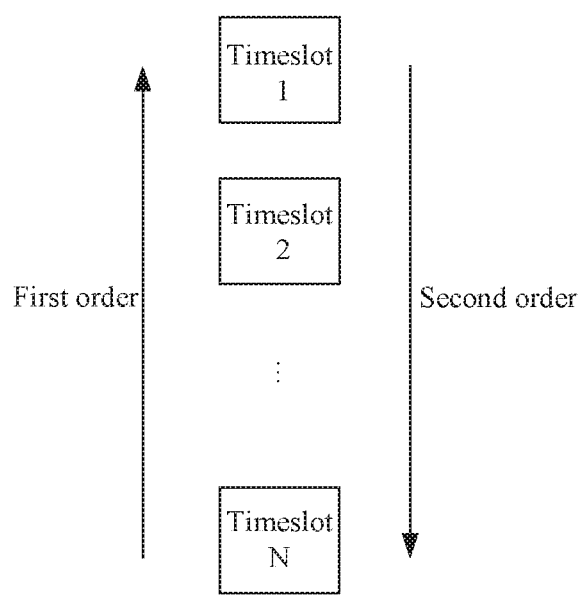
FIG. 5 is a schematic diagram of a timeslot allocation rule for large and small end nodes according to an embodiment of the present invention.
FIG. 6 is a schematic diagram of an APS overhead encoding format according to an embodiment of the present invention.

In this embodiment of the present invention, when a resource of a protection path is configured, one of two neighboring nodes on a shared link segment is set as a first preset type of node, and the other node is set as a second preset type of node. For example, the first preset type of node is a large end node, and the second preset type of node is a small end node. The large end node allocates resources starting from a timeslot having a largest number in a timeslot arrangement order, and the small end node allocates resources starting from a timeslot having a smallest number. For details, refer to FIG. 5. FIG. 5 is a schematic diagram of a timeslot allocation rule for large and small end nodes according to an embodiment of the present invention. A timeslot allocation order of the large end node is a first order, a timeslot allocation order of the small end node is a second order, and the first order and the second order are in opposite directions. Therefore, timeslot resources may be used maximally. The shared link segment E-F in the topology shown in FIG. 1 is used as an example. When a protection path (P1, P2, or the like) is configured on two nodes, namely, E and F, configuration information includes a protection-path ID, a priority, a service granularity, a timeslot, an upstream and downstream connection relationship, and a large-end-small-end relationship. The large-end-small-end relationship is, for example, that the node E is configured as a large end and the node F is configured as a small end. Similarly, on the shared protection path F-G, the node F is configured as a small end, and the node G is configured as a large end. Specifically, in an implementation, for the configuration information of the node A, refer to Table 1, and for the configuration information of the node B, refer to Table 3. Configuration information of the node E, configuration information of the node F, and configuration information of the node G are shown in Table 4, Table 5, and Table 6 below.

TABLE 4

4. Configuration information of the node E

| Protection-path ID | Priority | Service granularity | Upstream neighboring node | Large-end-small-end relationship between the node E and the upstream neighboring node | Timeslot used by the node E and the upstream neighboring node | Downstream neighboring node | Large-end-small-end relationship between the node E and the downstream neighboring node | Timeslot used by the node E and the downstream neighboring node |
|---|---|---|---|---|---|---|---|---|
| P1 | 1 | ODU0 | A | not used | timeslot 1 | F | large | dynamic |
| P2 | 2 | ODU1 | C | not used | timeslot 1 and timeslot 2 | F | large | dynamic |
| ... | ... | ... | ... | ... | ... | ... | ... | ... |

TABLE 5

5. Configuration information of the node F

| Protection-path ID | Priority | Service granularity | Upstream neighboring node | Large-end-small-end relationship between the node F and the upstream neighboring node | Timeslot used by the node F and the upstream neighboring node | Downstream neighboring node | Large-end-small-end relationship between the node F and the downstream neighboring node | Timeslot used by the node F and the downstream neighboring node |
|---|---|---|---|---|---|---|---|---|
| P1 | 1 | ODU0 | E | small | dynamic | G | small | dynamic |
| P2 | 2 | ODU1 | E | small | dynamic | G | small | dynamic |
| ... | ... | ... | ... | ... | ... | ... | ... | ... |

TABLE 6

6. Configuration information of the node G

| Protection-path ID | Priority | Service granularity | Upstream neighboring node | Large-end-small-end relationship between the node G and the upstream neighboring node | Timeslot used by the node G and the upstream neighboring node | Downstream neighboring node | Large-end-small-end relationship between the node G and the downstream neighboring node | Timeslot used by the node G and the downstream neighboring node |
|---|---|---|---|---|---|---|---|---|
| P1 | 1 | ODU0 | F | large | dynamic | B | not used | timeslot 2 |
| P2 | 2 | ODU1 | F | large | dynamic | B | not used | timeslot 1 and timeslot 2 |
| ... | ... | ... | ... | ... | ... | ... | ... | ... |

Optionally, the configuration information of the node E, the configuration information of the node F. and the configuration information of the node G may further include an active-path ID, for example, S1.

It should be noted that, in Table 4 and Table 6 because the node E is a neighboring node of the end node A, the node G is a neighboring node of the end node B, and non-shared link segments A-E and G-B are link segments exclusively occupied by P1, the large-end-small-end relationship may not need to be configured. Therefore, when the end node A and the end node B are configured, information that needs to be configured includes a protection-path ID, a priority, a service granularity, a timeslot, an upstream and downstream connection relationship, and the like, and does not include a large-end-small-end relationship. For P2, for a configuration manner of the end node C, refer to a configuration manner of the end node A shown in Table 1, and for a configuration manner of the end node D, refer to a configuration manner of the end node B shown in Table 3. Details are not described again.

In another implementation, a large-end-small-end relationship may also be configured for non-shared protection links (for example, links A-F and G-B). For example, configuration information of the node A, configuration information of the node E, configuration information of the node G, and configuration information of the node B are shown in Table 7 to Table 10 below, and the configuration information of the node is shown in Table 5.

TABLE 7

7. Configuration information of the node A

| Service ID | Protection-path ID | Priority | Service granularity | Downstream neighboring node | Large-end-small-end relationship between the node A and the downstream neighboring node | Timeslot used by the node A and the downstream neighboring node |
|---|---|---|---|---|---|---|
| W1 | P1 | 1 | ODU0 | E | small | dynamic |

TABLE 8

8. Configuration information of the node E

| Protection-path ID | Priority | Service granularity | Upstream neighboring node | Large-end-small-end relationship between the node E and the upstream neighboring node | Timeslot used by the node E and the upstream neighboring node | Downstream neighboring node | Large-end-small-end relationship between the node E and the downstream neighboring node | Timeslot used by the node E and the downstream neighboring node |
|---|---|---|---|---|---|---|---|---|
| P1 | 1 | ODU0 | A | large | dynamic | F | large | dynamic |
| P2 | 2 | ODU1 | C | large | dynamic | F | large | dynamic |
| ... | ... | ... | ... | ... | ... | ... | ... | ... |

TABLE 9

9. Configuration information of the node G

| Protection-path ID | Priority | Service granularity | Upstream neighboring node | Large-end-small-end relationship between the node G and the upstream neighboring node | Timeslot used by the node G and the upstream neighboring node | Downstream neighboring node | Large-end-small-end relationship between the node G and the downstream neighboring node | Timeslot used by the node G and the downstream neighboring node |
|---|---|---|---|---|---|---|---|---|
| P1 | 1 | ODU0 | F | large | dynamic | B | large | dynamic |
| P2 | 2 | ODU1 | F | large | dynamic | B | large | dynamic |
| ... | ... | ... | ... | ... | ... | ... | ... | ... |

TABLE 10

10. Configuration information of the node B

| Service ID | Protection-path ID | Priority | Service granularity | Upstream neighboring node | Large-end-small-end relationship between the node B and the upstream neighboring node | Timeslot used by the node B and the upstream neighboring node |
|---|---|---|---|---|---|---|
| W1 | P1 | 1 | ODU0 | G | small | dynamic |

It should be noted that, for a same shared link segment (for example, the link E-F in this embodiment), large-end-small-end relationships for different protection paths need to be configured consistently. For example, for the protection path P1, the node E is configured as a large end, and the node F is configured as a small end. Therefore, for the protection path P2, the node E is also configured as a large end, and the node F is also configured as a small end. Such a practice has a benefit of avoiding a case in which an erroneous connection is caused because a same timeslot is allocated to different protection paths. For example, if the node E is configured as a large end and the node F is configured as a small end for the protection path P1, the node E is configured as a small end and the node F is configured as a large end for the protection path P2. If the node A finds that S is faulty and a protection switching process is triggered, when an SF message reaches the node E, because the node E is configured as a large end on P1, resources are allocated starting from a timeslot having a largest number. In this case, if S2 is also faulty and the node D finds that S2 is faulty, when an SF message reaches the node F, because the node F is configured as a large end on P2, resources are also allocated starting from a timeslot having a largest number. Therefore, a same timeslot is allocated to two protection paths. As a result, an erroneous connection from the node A to the node D is established. This is not allowed to occur in an SMP scenario.

Moreover, for different link segments, configurations of the large and small ends do not affect each other. For example, on the link segment E-F, the node E is configured as a large end, and the node F is configured as a small end. Therefore, on the link segment F-G, the node F may be configured as a large end or may be configured as a small end, and correspondingly, the node G may be configured as a small end or may be configured as a large end, provided that it is ensured that one of two neighboring nodes on a path having a timeslot resource shared by a plurality of protection paths is a large end, and the other is a small end.

In this embodiment of the present invention, it is assumed that each of the link segments A-E, E-F, F-G, and G-B is an OTU2 link and includes eight timeslot resources. For the link segment E-F, the node E is designated as a large end, and the node F is designated as a small end. For the link segment F-G, the node F is designated as a small end, and the node G is designated as a large end. In this case, when any protection path (it is assumed that P1) initiates a switching request (which is embodied as sending a switching message SF by using APS overheads), if the request of the protection path is sent by the node E to the node F, the node E preferentially allocates a protection timeslot from the large end. It is assumed that P1 requires one timeslot resource, and in this case, each of a timeslot 1 to a timeslot 8 is an idle timeslot, the node E allocates the timeslot 8 of the eight idle timeslots to P1 for use. After this, if another protection path (it is assumed that P2) initiates a switching request, and the request is sent by the node F to the node E, the node F preferentially allocates a protection timeslot from the small end. It is assumed that P2 requires two timeslot resources, and in this case, each of a timeslot 1 to a timeslot 7 is an idle timeslot, the node F allocates the timeslots 1 and 2 of the seven idle timeslots to P2 for use. Specifically, steps performed by nodes in the signaling flowchart in FIG. 4 are described below.

First, description is given by using an example in which the node A uses the configuration manner in Table 7, the node E uses the configuration manner in Table 8, the node F uses the configuration manner in Table 5, the node G uses the configuration manner in Table 9, and the node B uses the configuration manner in Table 10.

Node A: When detecting that the active path S1 is faulty, the node A selects one available timeslot for P1 from available timeslots between the node A and the node E in the second order, and then sends an SF message to the downstream neighboring node E. Optionally, the node A may further receive an RR message from the downstream neighboring node E.

Specifically, that the node A detects that the active path S is faulty may be that the node A detects a link fault or the node B detects a link fault and notifies the node A of the link fault. When detecting that the active path S1 is faulty, the node A may allocate a timeslot to the protection path P1 after the node A determines that at least some available timeslots exist between the node A and the downstream neighboring node E and a quantity of the some available timeslots is greater than or equal to a quantity of timeslots that P1 needs to occupy. For example, the node A determines, based on the configuration information of the node A, that a service granularity of P1 is ODU0 and P1 needs to occupy one timeslot, and it is assumed that in this case, none of eight timeslots between A and E is occupied. Because the node A is a small end node relative to the node E, the node A selects, from the eight idle timeslots, a timeslot 1 that has a smallest number and that is to be used by P1, and the node A uses the timeslot 1 to establish bridging and selection from A to E. The node A further sends an SF message to the downstream neighboring node E, and an order of performing two actions in which the node A uses the timeslot 1 to establish bridging and selection between A and E and the node A sends the SF message to the downstream neighboring node E is not limited. In this implementation, the downstream neighboring node E may not reply with an RR message, and after determining that P1 uses the timeslot 1, the node A may use the timeslot 1 to complete establishment of a cross-connection between the node A and the node E.

The SF message sent by the node A to the node E may include but is not limited to: a type (SF) of a protection switching request message, a switching object (P), and an ID of a timeslot that needs to be activated (for example, an ID of the timeslot 1, namely. TS #1). The ID of the timeslot carried in the SF message is used in a case in which after receiving the SF message, the downstream neighboring node E may learn of, by parsing the SF message, the timeslot that is used to establish a cross-connection, thereby reducing node operation complexity, and further reducing a protection switching time and improving efficiency.

Alternatively, after selecting the timeslot 1 for P1, the node A performs the following actions: (1) sending an SF message to the downstream neighboring node E; and (2) using the timeslot 1 to complete bridging of the node A in a direction relative to E, for example, bridging 3 shown in FIG. 3. In this case, step 2 may be performed or may not be performed. If step 2 is performed, an order of performing step 1 and step 2 is not limited. After receiving the RR message sent by the node E, the node A completes the following actions: (3) using the timeslot 1 to complete selection of the node A in a direction relative to the node E, for example, selection 4 shown in FIG. 3; and (4) performing step 2 if step 2 is not performed previously, that is, using the timeslot 1 to complete bridging of the node A in the direction relative to the node E. An order of performing step 3 and step 4 is not limited. A difference between this implementation and a previous implementation is that the downstream neighboring node E needs to reply with an RR message, cross-connection of the node A is completed after the node A receives the RR message from the downstream neighboring node E. Compared with the previous implementation, this implementation may prevent an erroneous connection from occurring, thereby improving protection switching reliability.

Specifically, when the node A receives an RR message of the node E depends on when the node E sends the RR message to the node A. Refer to the step performed by the node E. The SF message sent by the node A to the downstream neighboring node E may be indicated by using APS overheads, and an overhead encoding format is not limited in the present invention. For example, FIG. 6 is a schematic diagram of an APS overhead encoding format according to an embodiment of the present invention. An overhead part of an APS message may be used to describe a status of SMP protection switching, four bytes, namely, 32 bits exist in total, and three types of information are described: (1) Type of a request message: the type is included in the $1^{st}$ bit to the $4^{th}$ bit, and indicates a type of a protection switching request, for example, SF, SD (Signal Degrade), RR, NR (No Request), MS (Manual Switch), and FS (Forced Switch). (2) Service ID of a service requesting protection: the service ID is included in the $9^{th}$ bit to the $16^{th}$ bit, and indicates a service ID of a service requesting a shared protection resource, for example, W. When no service requests a shared protection resource, all of the bits are set to zero. (3) Service ID of a service completing bridging: the service ID is included in the $17^{th}$ bit to the $24^{th}$ bit, and indicates a service ID of a service completing bridging, for example, W1. When no service completes bridging, all of the bits are set to zero.

Node E: After receiving the SF message from the node A, the node E selects one timeslot for P1 from available timeslots between the node E and the node F in the first order, and then sends the SF message to the downstream neighboring node F. Optionally, the node E may further send an RR message to the upstream neighboring node A, and the node E may further receive an RR message from the downstream neighboring node F.

Specifically, because a timeslot on a link segment A-E is dynamically configured, the node E uses, based on a timeslot ID carried in the SF message sent by the node A, a timeslot 1 to complete bridging and selection in directions between the node E and the node A. Optionally, the node E may further send an RR message to the node A, and an order of performing two actions in which the node E establishes bridging and selection in directions between the node E and the node A and sends the RR message to the node A is not limited.

Moreover, after determining that at least some available timeslots exist between the node E and the downstream neighboring node F and a quantity of the some available timeslots is greater than or equal to a quantity of timeslots that P1 needs to occupy, the node E allocates a timeslot to P1. For example, the node E determines, based on the configuration information of the node E, that a service granularity of P1 is ODU0 and P1 needs to occupy one timeslot, and the node E is a large end node relative to the downstream neighboring node F. Therefore, the node E allocates timeslot resources starting from a timeslot having a largest number based on timeslot numbers. Assuming that each of eight timeslots on a link E-F is an idle timeslot, a quantity of available timeslots is eight, and the node E selects a timeslot 8 of the eight available timeslots that is to be used by P1. The node E uses the timeslot 8 to establish bridging and selection between E and F, for example, bridging 1 and selection 2 shown in FIG. 3. The available timeslots herein include an idle timeslot, namely, a timeslot not occupied by another service. Certainly, the available timeslots may further include a timeslot occupied by a service having a low priority. Then, the node E sends an SF message to the downstream neighboring node F, and an order of performing two actions in which the node E uses the timeslot 8 to establish bridging and selection between E and F and the node E sends the SF message to the downstream neighboring node F is not limited. In this implementation, the downstream neighboring node F may not reply with an RR message, and after determining that P1 uses the timeslot 8, the node E may use the timeslot 8 to complete establishment of a cross-connection between the node E and the node F.

The SF message sent by the node E to the node F may include but is not limited to: a type (SF) of a protection switching request message, a switching object (P), and an ID of a timeslot that needs to be activated (for example, an ID of the timeslot 8, namely, TS #8).

Alternatively, after selecting the timeslot 8 for P1, the node E performs the following actions: (1) sending an SF message to the downstream neighboring node F; (2) replying to the upstream neighboring node A with an RR message: (3) using the timeslot 1 to complete bridging and selection of the node E in directions relative to the node A, for example, bridging 2 and selection 1 shown in FIG. 3; and (4) using the timeslot 8 to complete bridging of the node E in a direction relative to the node F, for example, bridging 1 shown in FIG. 3. In this case, step 4 may be performed or may not be performed, and an order of performing the four actions in step 1, step 2, step 3, and step 4 is not limited. After receiving the RR message sent by the node F, the node E completes the following actions: (5) using the timeslot 8 to complete selection of the node E in a direction relative to the node F, for example, selection 2 shown in FIG. 3; and (6) performing step 4 if step 4 is not performed previously, that is, using the timeslot 8 to complete bridging of the node E in the direction relative to the node F. An order of performing the two actions in step 5 and step 6 is not limited. A difference between this implementation and a previous implementation is that the downstream neighboring node F needs to reply with an RR message, cross-connection of the node E is completed after the node E receives the RR message from the downstream neighboring node F. Compared with the previous implementation, this implementation may prevent an erroneous connection from occurring, thereby improving protection switching reliability.

Specifically, the node E may first send an SF message to the downstream neighboring node F, and then send an RR message to the upstream neighboring node A; or the node E may first send an RR message to the upstream neighboring node A, and then send an SF message to the downstream neighboring node F. After receiving the SF message from the node A, the node E may immediately send the RR message to the node A. Optionally, after receiving the RR message sent by the node F, the node E may further send the RR message to the node A. When the node E receives an RR message from the node F depends on when the node F sends the message to the node E. Refer to a process in which the node A receives the RR message from the node E.

Node F: After receiving the SF message from the upstream neighboring node E, the node F selects one timeslot for P1 from available timeslots between the node F and the node G in the second order, and sends the SF message to the downstream neighboring node G. Optionally, the node F may further send an RR message to the upstream neighboring node E, and the node F may further receive an RR message from the downstream neighboring node G.

Specifically, if after receiving the SF message sent by the node E, the node F determines, based on the configuration information of the node F, that the node F is a small end relative to the node E, the node F uses, based on a timeslot ID carried in the SF message sent by the node E, a timeslot 8 to complete bridging and selection in directions between the node F and the node E.

Moreover, after determining that at least some available timeslots exist between the node F and the downstream neighboring node G and a quantity of the some available timeslots is greater than or equal to a quantity of timeslots that P1 needs to occupy, the node F allocates a timeslot to P1. For example, the node F determines, based on the configuration information of the node F, that a service granularity of P1 is ODU0 and P1 needs to occupy one timeslot, and the node F is a small end node relative to the downstream neighboring node G. Therefore, the node F allocates timeslot resources starting from a timeslot having a smallest number. Assuming that each of eight timeslots on a link F-G is an idle timeslot, a quantity of available timeslots is eight, and the node F selects a timeslot 1 having a smallest number of the eight available timeslots that is to be used by P1. The node F uses the timeslot 1 to establish bridging and selection between F and G. The SF message sent by the node F to the node G includes but is not limited to: a type (SF) of a protection switching request message, a switching object (P1), and an ID of a timeslot that needs to be activated (for example, an ID of the timeslot 1, namely. TS #1).

Other processing processes of the node F are similar to those of the node E, and details are not described again.

Node G: After receiving the SF message from the upstream neighboring node F, the node G selects one timeslot for P1 from available timeslots between the node G and the node B in the first order, and sends the SF message to the downstream neighboring node B. Optionally, the node G may further send an RR message to the upstream neighboring node F, and the node G may further receive an RR message from the downstream neighboring node B.

Specifically, if after receiving the SF message sent by the node F, the node G determines, based on the configuration information of the node G, that the node G is a small end relative to the node F, the node G uses, based on a timeslot ID carried in the SF message sent by the node F, a timeslot 1 to complete bridging and selection in directions between the node G and the node F.

Moreover, after determining that at least some available timeslots exist between the node G and the downstream neighboring node B and a quantity of the some available timeslots is greater than or equal to a quantity of timeslots that P1 needs to occupy, the node G allocates a timeslot to P1. For example, because a timeslot on a link segment G-B is dynamically configured, the node G determines, based on the configuration information of the node G, that a service granularity of P1 is ODU0 and P1 needs to use one timeslot. Moreover, because the node G is a large end relative to the node B, the node G selects, from eight idle timeslots between G and B, a timeslot 8 that has a largest number and that is to be used by P1, and the node G uses the timeslot 8 to establish bridging and selection between G and B. The SF message sent by the node G to the node B may include: a type (SF) of a protection switching request message and a switching object (P1), and if the node G uses the configuration manner in Table 9, the SF message sent by the node G to the node B further includes an ID of a timeslot that needs to be activated (for example, an ID of the timeslot 8, namely, TS #8).

An order of performing two actions in which the node G establishes bridging and selection and the node G sends RR to the node F is not limited.

Other processing processes of the node G are similar to those of the node E and the node F, and details are not described again.

Node B: After receiving the SF message from the upstream neighboring node G, the node B establishes a cross-connection between the node B and the node G. Optionally, the node B may further send an RR message to the node G.

Specifically, because a timeslot on a link segment G-B is dynamically configured, and the node B determines, based on the configuration information of the node B, that the node B is a small end relative to the node G, the node B uses, based on a timeslot ID carried in the SF message sent by the node G, a timeslot 8 to establish selection from G to B and bridging from B to G. Specifically, for the establishing, by the node B, selection from G to B and bridging from B to G, selection may be first established, and then bridging is established; bridging is first established, and then selection is established; or selection and bridging are established simultaneously.

An order of performing two actions in which the node B establishes bridging and selection and the node B sends RR to the node G is not limited.

Alternatively, description is given by using an example in which the node A uses the configuration manner in Table 1, the node E uses the configuration manner in Table 4, the node F uses the configuration manner in Table 5, the node G uses the configuration manner in Table 6, and the node B uses the configuration manner in Table 3.

Node A: When the node A detects that the active path S1 is faulty because the large-end-small-end relationship is not configured for the node A, the node A determines, based on the configuration information of the node A, that P1 needs to occupy the timeslot 1. After determining that the timeslot 1 is available, the node A uses the timeslot 1 to establish bridging and selection between A and E, for example, bridging 3 and selection 4 shown in FIG. 3. Moreover, the SF message sent by the node A to the node E includes a type (SF) of a protection switching request message and a switching object (P1), and optionally, the SF message may further include an ID of a timeslot that needs to be activated (for example, an ID of the timeslot 1, namely, TS #1).

Alternatively, after determining that P1 uses the timeslot 1, the node A performs the following actions: (1) sending an SF message to the downstream neighboring node E; and (2) using the timeslot 1 to complete bridging of the node A in a direction relative to E, for example, bridging 3 shown in FIG. 3. In this case, step 2 may be performed or may not be performed. If step 2 is performed, an order of performing step 1 and step 2 is not limited. After receiving the RR message sent by the node E, the node A completes the following actions: (3) using the timeslot 1 to complete selection of the node A in a direction relative to the node E, for example, selection 4 shown in FIG. 3; and (4) completing step 2 if step 2 is not completed previously, that is, using the timeslot 1 to complete bridging of the node A in the direction relative to the node E. An order of performing step 3 and step 4 is not limited. A difference between this implementation and a previous implementation is that the downstream neighboring node E needs to reply with an RR message, cross-connection of the node A is completed after the node A receives the RR message from the downstream neighboring node E. Compared with the previous implementation, this implementation may prevent an erroneous connection from occurring, thereby improving protection switching reliability.

Node E: After receiving the SF message sent by the node A, the node E determines, based on the configuration information of the node E, that P1 needs to use the timeslot 1, and if the node E determines that the timeslot 1 is available, the node E uses the timeslot 1 to complete bridging and selection in directions between the node E and the node A, for example, bridging 2 and selection 1 shown in FIG. 3. Alternatively, if the SF message sent by the node A further includes an ID of a timeslot that needs to be activated, the node E uses, based on a timeslot ID carried in the SF message, a timeslot 1 to complete bridging and selection in directions between the node E and the node A. Optionally, the node E further sends an RR message to the node A. An order of performing two actions in which the node E uses the timeslot 1 to establish selection and bridging between the node E and the node A and the node E sends the RR message to the node A is not limited.

For an operation of the node F, refer to the description corresponding to the node F in the embodiment shown in FIG. 4. Details are not described herein again.

Node G: After receiving the SF message from the node F, the node G uses, based on a timeslot ID carried in the SF message sent by the node F, a timeslot 1 to complete bridging and selection in directions between the node G and the node F.

Moreover, the node G determines, based on the configuration information of the node G, that P1 needs to occupy the timeslot 2, and if the node G determines that the timeslot 2 is available, the node G uses the timeslot 2 to establish bridging and selection between G and B. The node G further sends an SF message to the downstream neighboring node B. The SF message sent by the node G to the node B includes a type (SF) of a protection switching request message and a switching object (P1), and optionally, the SF message may further include an ID of a timeslot that needs to be activated (for example, an ID of the timeslot 2, namely, TS #2).

Node B: After receiving the SF message from the node G, the node B determines, based on the configuration information of the node B, that P1 needs to occupy the timeslot 2, and if the node B determines that the timeslot 2 is available, the node B uses the timeslot 2 to establish selection and bridging between the node B and the node G; or uses, based on a timeslot ID carried in the SF message sent by the node G, the timeslot 2 to establish selection and bridging between the node B and the node G. Optionally, the node B further sends an RR message to the node G. An order of performing two actions in which the node B uses the timeslot 2 to establish selection and bridging between the node B and the node G and the node B sends the RR message to the node G is not limited.

In this case, the protection switching process of P1 ends, and W1 may be switched to P1 and transmitted. After this, if the node D detects that the active path S2 also is faulty, the node D requests to allocate a timeslot resource to P2. When the node G receives the SF message from the node D, because the node G is a large end relative to the node F the node G allocates a timeslot to P2 in the second order. In this case, the node G determines that seven idle timeslots remain in the link F-G, but P2 needs to occupy two timeslots. Therefore, the node G selects the timeslot 7 and the timeslot 8 that are to be used by P2. To be specific, the node G uses the timeslot 7 and the timeslot 8 to establish bridging and selection between the node G and the node F. When the node F receives the SF message from the node G, because the node F is a small end relative to the node E, the node F allocates timeslots to P2 in ascending order of the timeslot numbers. In this case, the node F determines that seven idle timeslots remain in the link E-F, but P2 needs to occupy two timeslots. Therefore, the node F selects the timeslot 1 and the timeslot 2 that are to be allocated to P2 for use. The rest can be deduced by analogy. After all of the timeslots are allocated completely, a preemption scenario is entered, and a timeslot allocation rule of the preemption scenario is described below.

In the protection switching process shown in FIG. 4, when receiving an SF message, any node needs to determine, based on a timeslot resource use situation, whether the switching is ordinary switching or preemption. The determining depends on a timeslot use situation: When remaining timeslots may satisfy requested switching (for example, if four timeslots remain, two timeslots need to be used for protection, and 4>2, the remaining timeslots may satisfy the requested switching), the switching is the ordinary switching; or when remaining timeslots cannot satisfy requested switching (for example, if two timeslots remain, eight timeslots need to be used for protection, and 2<8, the remaining timeslots cannot satisfy the requested switching, and an existing resource needs to be occupied), the switching is the preemption scenario.

In the preemption scenario, if a service W3 is faulty after all shared timeslot resources are occupied, a timeslot resource needs to be requested. Regardless of whether a node is a large end node or a small end node, protection for a node having a lowest priority is interrupted, and a timeslot resource is set aside and is to be used by P3. If P3 exactly has a lowest priority, preemption fails, no timeslot resource can be allocated to W3, and W3 is interrupted. For example, if a link between the node F and the node G is an OTU1 link, and two timeslot resources on the OTU1 link are shared by four protection paths P1, P2, P3, and P4 whose priorities are in descending order of P1>P2>P3>P4, and each of P1, P2, P3, and P4 needs to occupy one timeslot. If timeslot resources of two timeslots on the OTU link are used by P3 and P4 at a moment, the node F receives an SF message sent by the node E, where the SF message includes an identifier of P2, and the node F determines, based on the configuration information of the node F, that a priority of P2 is higher than those of P3 and P4 and each of P2, P3, and P4 occupies only one timeslot, the node F tears down cross-connection of P4 having a lowest priority, to set aside one idle timeslot, and uses the idle timeslot to establish cross-connection from the node F to the node G for P2. After preemption, two timeslots are respectively used to protect P2 and P3. If the node F receives an SF message carrying an identifier of P4, the node F determines that a priority of P4 is lower than priorities of P2 and P3 that are being protected, the node F performs no processing on the SF message, and a service W4 corresponding to P4 is interrupted because the service W4 has not obtained a timeslot resource through preemption. It should be noted that priority information of services on large and small end nodes needs to be configured consistently; otherwise, a deadlock phenomenon of repetitive preemption occurs. Moreover, when a service needs to preempt a plurality of timeslots, the service preferentially preempts a timeslot occupied by a service having a lowest priority, till a requirement is satisfied.

For another example, if two timeslot resources on the OTU1 link between the node F and the node G are shared by two protection paths P1 and P2, a priority of P2 is higher than a priority of P1, and P1 needs to occupy one timeslot, P2 needs to occupy two timeslots. If a timeslot resource of one timeslot on the OTU1 link is used by P1 at a moment, another timeslot is idle, the node F receives an SF message sent by the node E, where the SF message includes an identifier of P2, the node F determines, based on the configuration information of the node F, that P2 needs to occupy two timeslots, only one timeslot is an idle timeslot, and the priority of P2 is higher than the priority of P1, the node F tears down cross-connection of P1 whose priority is relatively low, to set aside one idle timeslot, and uses two idle timeslots to establish cross-connection to the node G for P2. A current cross-connection of a protection path having a low priority on the intermediate node is torn down, so that a protection timeslot resource of the intermediate node is idle, so as to be used by a protection path having a high priority.

In this embodiment, a service switching process may be initiated by a single end. To be specific, using the service W1 as an example, when the active path A-B is faulty, the node A (or the node B) initiates switching. Based on this assumption, a protection switching request message of P1 is transferred in a direction from E to F (initiated by the node A). To be specific, a timeslot resource of P1 on E-F is allocated by the node E.

In this embodiment, in a most simple manner, a large end node sequentially performs allocation (timeslot 8->timeslot 1) starting from a timeslot having a largest number, and a small end node sequentially performs allocation (timeslot 1->timeslot 8) starting from a timeslot having a smallest number. Actually, timeslot allocation is changed to a particular extent. For example, the large end node sequentially performs allocation starting from a timeslot having a second largest number but finally allocates a node having a largest number (timeslot 7->timeslot 1->timeslot 8), and the small end node performs allocation starting from a timeslot having a largest number, and then allocates timeslots sequentially in ascending order from a timeslot having a smallest number (timeslot 8->timeslot 1->timeslot 7). Based on a permutation and combination principle, a method having a complexity of O(N!) may exist for timeslot allocation. This is not limited in the present invention. However, usually, to maximally use a shared timeslot resource, a timeslot resource allocation order of the large end node should be completely opposite to a timeslot resource allocation order of the small end node. Moreover, a timeslot resource allocation order of the large end node may alternatively be not opposite to a timeslot allocation order of the small end node. For example, a timeslot allocation order of the large end node is: a timeslot 1, a timeslot 3 . . . , and a timeslot N−1, and a timeslot allocation order of the small end node is: a timeslot 2, a timeslot 4, . . . , and a timeslot N.

Through the implementation of this embodiment of the present invention, when the intermediate node receives the SF message, the intermediate node allocates an available timeslot to the first protection path from the available timeslots in the preset order. When each of a plurality of active paths sharing a same timeslot resource is faulty, a problem that a service having a low priority is interrupted because the service cannot obtain a timeslot resource is avoided, thereby improving timeslot resource utilization.

Figure 7:
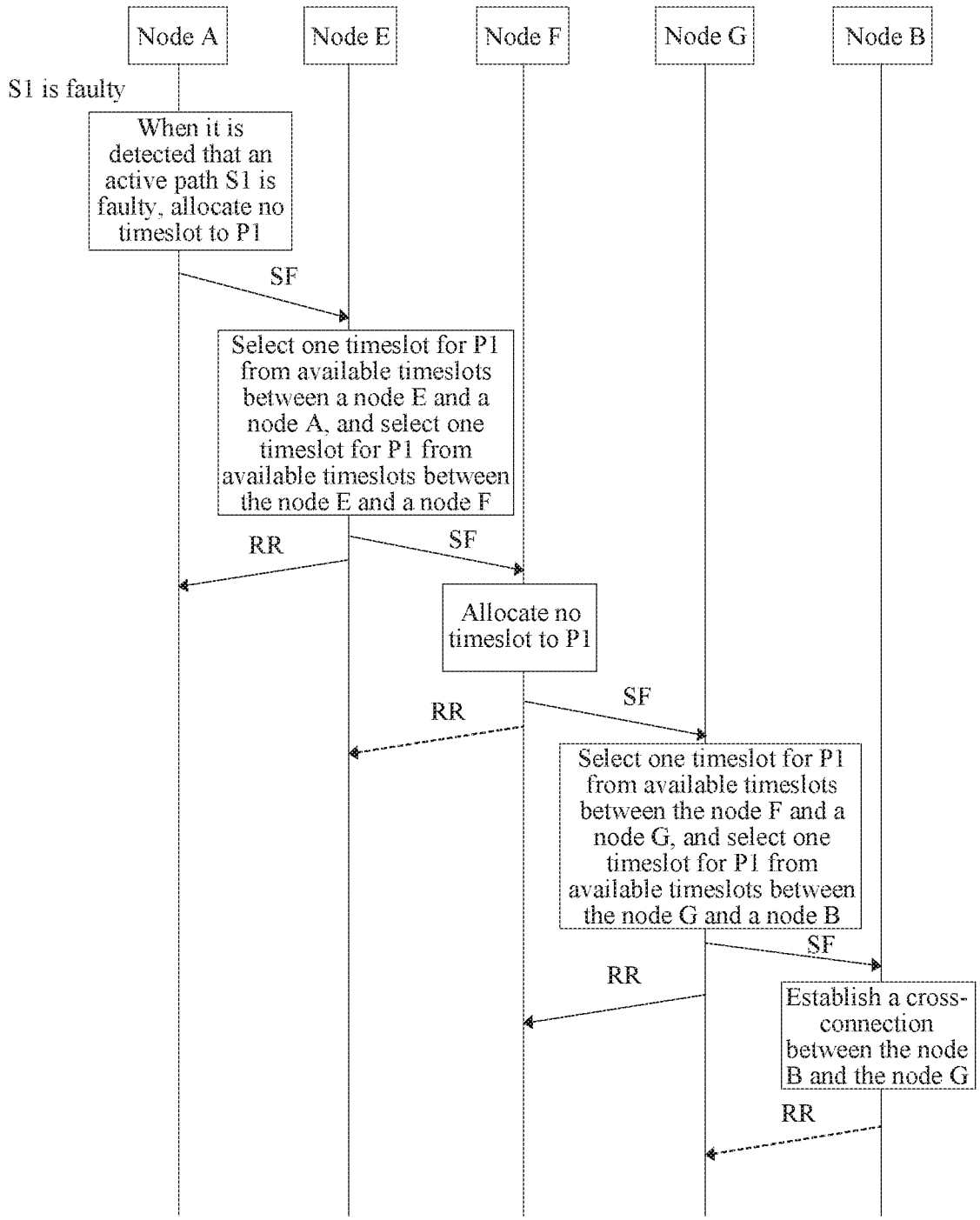
FIG. 7 is a signaling flowchart of a protection switching method according to an embodiment of the present invention.

FIG. 7 is a signaling flowchart of a protection switching method according to an embodiment of the present invention. This process is described for the topology shown in FIG. 1.

In this embodiment of the present invention, when a resource of a protection path is configured, one of two neighboring nodes on a shared link segment is set as a type of node, and the other node is set as another type of node. For example, one of two neighboring nodes is set as a master node, and the other node is set as a slave node. The master node is responsible for determining how to allocate a timeslot, and the slave node does not allocate a timeslot. Moreover, when the master node allocates a timeslot, a timeslot allocation method is not limited. To be specific, a timeslot that is specifically designated does not need to be limited. The master node may perform timeslot allocation in the first order in FIG. 5, may perform timeslot allocation in the second order in FIG. 5, or may perform timeslot allocation in another order. For example, a timeslot allocation order is: a timeslot 1, a timeslot 3, . . . a timeslot N−1, a timeslot 2, a timeslot 4, . . . , and a timeslot N. The master node may further randomly select a timeslot from available timeslots that is to be used by a protection path, and a timeslot allocation rule of the master node is not limited in this embodiment of the present invention. The shared link segment E-F in the topology in FIG. 1 is used as an example. When a protection path (P1, P2, or the like) is configured on two nodes, namely, E and F, in addition to information that needs to be configured in the prior art (including a protection-path ID, a priority, a service granularity, a timeslot, an upstream and downstream connection relationship, and the like), master-slave relationship information further needs to be configured. For example, the node E is configured as a master node, and the node F is configured as a slave node. On a shared link segment F-G, the node F is configured as a slave node, and a node G is configured as a master node. Specifically, in an implementation, for configuration information of a node A, refer to Table 1; for configuration information of a node B, refer to Table 3; and configuration information of the node E, configuration information of the node F, and configuration information of the node G are shown in Table 11, Table 12, and Table 13 below.

TABLE 11

11. Configuration information of the node E

| Protection-path ID | Priority | Service granularity | Upstream neighboring node | Master-slave relationship between the node E and the upstream neighboring node | Timeslot used by the node E and the upstream neighboring node | Downstream neighboring node | Master-slave relationship between the node E and the downstream neighboring node | Timeslot used by the node E and the downstream neighboring node |
|---|---|---|---|---|---|---|---|---|
| P1 | 1 | ODU0 | A | not used | timeslot 1 | F | master node | dynamic |
| P2 | 2 | ODU1 | C | not used | timeslot 1 and timeslot 2 | F | master node | dynamic |
| . . . | . . . | . . . | . . . | . . . | . . . | . . . | . . . | . . . |

TABLE 12

12. Configuration information of the node F

| Protection-path ID | Priority | Service granularity | Upstream neighboring node | Master-slave relationship between the node F and the upstream neighboring node | Timeslot used by the node F and the upstream neighboring node | Downstream neighboring node | Master-slave relationship between the node F and the downstream neighboring node | Timeslot used by the node F and the downstream neighboring node |
|---|---|---|---|---|---|---|---|---|
| P1 | 1 | ODU0 | E | slave node | dynamic | G | slave node | dynamic |
| P2 | 2 | ODU1 | E | slave node | dynamic | G | slave node | dynamic |
| . . . | . . . | . . . | . . . | . . . | . . . | . . . | . . . | . . . |

TABLE 13

13. Configuration information of the node G

| Protection-path ID | Priority | Service granularity | Upstream neighboring node | Master-slave relationship between the node G and the upstream neighboring node | Timeslot used by the node G and the upstream neighboring node | Downstream neighboring node | Master-slave relationship between the node G and the downstream neighboring node | Timeslot used by the node G and the downstream neighboring node |
|---|---|---|---|---|---|---|---|---|
| P1 | 1 | ODU0 | F | master node | dynamic | B | not used | timeslot 2 |
| P2 | 2 | ODU1 | F | master node | dynamic | B | not used | timeslot 1 and timeslot 2 |
| . . . | . . . | . . . | . . . | . . . | . . . | . . . | . . . | . . . |

It should be noted that, in Table 11 and Table 13, because the node E is a neighboring node of the end node A, the node G is a neighboring node of the end node B, and non-shared link segments A-E and G-B are link segments exclusively occupied by P1, the master-slave relationship may not need to be configured. Therefore, when the end node A and the end node B are configured, the existing node configuration manner may continue to be used. To be specific, information that needs to be configured includes a protection-path ID, a priority, a service granularity, a timeslot, an upstream and downstream connection relationship, and the like, and does not include configuration of a master-slave relationship. For example, the configuration information of the end node A is shown in Table 1. For a configuration manner of the end node C, refer to the configuration manner of the end node A shown in Table 1. Details are not described again. The configuration manner of the end node B may be, for example, shown in Table 3. For a configuration manner of the end node D, refer to the configuration manner of the end node B shown in Table 3. Details are not described again.

In another implementation, master-slave relationship information may also be configured for non-shared protection links (for example, links A-E and G-B). For example, configuration information of the node A, configuration information of the node E, configuration information of the node G, and configuration information of the node B are shown in Table 14 to Table 17 below. For the configuration information of the node F, refer to Table 12.

TABLE 14

| | | | | | | Master-slave relationship between the node A and the downstream neighboring node | Timeslot used by the node A and the downstream neighboring node |
|---|---|---|---|---|---|---|---|
| Service ID | Protection-path ID | Priority | Service granularity | | Downstream neighboring node | | |
| W1 | P1 | 1 | ODU0 | | E | slave node | dynamic |

TABLE 15

15. Configuration information of the node E

| Protection-path ID | Priority | Service granularity | Upstream neighboring node | Master-slave relationship between the node E and the upstream neighboring node | Timeslot used by the node E and the upstream neighboring node | Downstream neighboring node | Master-slave relationship between the node E and the downstream neighboring node | Timeslot used by the node E and the downstream neighboring node |
|---|---|---|---|---|---|---|---|---|
| P1 | 1 | ODU0 | A | master node | dynamic | F | master node | dynamic |
| P2 | 2 | ODU1 | C | master node | dynamic | F | master node | dynamic |
| ... | ... | ... | ... | ... | ... | ... | ... | ... |

TABLE 16

16. Configuration information of the node G

| Protection-path ID | Priority | Service granularity | Upstream neighboring node | Master-slave relationship between the node G and the upstream neighboring node | Timeslot used by the node G and the upstream neighboring node | Downstream neighboring node | Master-slave relationship between the node G and the downstream neighboring node | Timeslot used by the node G and the downstream neighboring node |
|---|---|---|---|---|---|---|---|---|
| P1 | 1 | ODU0 | F | master node | dynamic | B | master node | dynamic |
| P2 | 2 | ODU1 | F | master node | dynamic | B | master node | dynamic |
| ... | ... | ... | ... | ... | ... | ... | ... | ... |

TABLE 17

| 17. Configuration information of the node B | | | | | | |
|---|---|---|---|---|---|---|
| Service ID | Protection-path ID | Priority | Service granularity | Upstream neighboring node | Master-slave relationship between the node B and the upstream neighboring node | Timeslot used by the node B and the upstream neighboring node |
| W1 | P1 | 1 | ODU0 | G | slave node | dynamic |

It should be noted that, for a same shared protection link (for example, F-F in this embodiment), master-slave relationships for different protection paths need to be configured consistently. For example, for the protection path P1, the node F is configured as a master node, and the node F is configured as a slave node. Therefore, for the protection path P2, the node E is also configured as a master node, and the node F is also configured as a slave node. Such a practice has a benefit of avoiding a problem that an erroneous connection is caused because a same timeslot is allocated to different protection paths.

Moreover, for different link segments, configurations of the master-slave relationship do not affect each other. For example, on the link segment E-F, the node E is configured as a master node, and the node F is configured as a slave node. Therefore, on the link segment F-G, the node F may be configured as a master node or may be configured as a slave node, and correspondingly, the node G may be configured as a slave node or may be configured as a master node, provided that it is ensured that one of two neighboring nodes on a path having a timeslot resource shared by a plurality of protection paths is a master node, and the other is a slave node.

In this embodiment of the present invention, it is assumed that each of the link segments A-E, E-F. F-G, and G-B is an OTU2 link and includes eight timeslot resources. For the link segment A-E, the node E is designated as a master node, and the node F is designated as a slave node. For the link segment F-G, the node F is designated as a slave node, and the node G is designated as a master node. In this case, when any protection path (it is assumed that P1) initiates a switching request, if the request of the protection path is sent by the node E to the node F, assuming that P1 requires one timeslot resource, the node E is used as a master node, and selects one timeslot from available timeslots between E and F and allocates the timeslot to P1 for use. A selection rule is not limited herein. Allocation may start from a timeslot having a largest number, allocation may start from a timeslot having a smallest number, or allocation may start from an intermediate timeslot. After this, if another protection path (it is assumed that P2) initiates a switching request, and the request is sent by the node F to the node E, the node F serves as a slave node, and sends an SF message to only the node E, but does not allocate a protection timeslot. When the node E receives the SF message from the node F, the node E allocates a timeslot resource to P1 and informs the node F of an ID of the allocated timeslot by using an RR message. Specifically, steps performed by nodes in the signaling flowchart in FIG. 7 are described in detail below.

First, description is given by using an example in which the node A uses the configuration manner in Table 14, the node E uses the configuration manner in Table 15, the node F uses the configuration manner in Table 12, the node G uses the configuration manner in Table 16, and the node B uses the configuration manner in Table 17.

Node A: When detecting that an active path S1 is faulty, the node A does not allocate a timeslot to P1, but sends an SF message to the downstream neighboring node E. The node A further receives an RR message from the downstream neighboring node E.

Specifically, because a master-slave relationship is configured for the node A and the node A is a slave node relative to the node E, the node A does not allocate a timeslot to P1 and sends an SF message to only the downstream node E. After receiving the SF message sent by the node A and determining that the node E is a master node relative to the node A, the node E allocates a timeslot to P1, adds an ID of the allocated timeslot to an RR message, and returns the RR message to the node A. and the node A receives the RR message sent by the node E, obtains the ID of the timeslot, and then uses the timeslot selected by the node E to establish bridging and selection between the node A and the node E. The SF message sent by the node A to the node E includes but is not limited to: a type (SF) of a protection switching request message and a switching object (P1).

Node E: After receiving the SF message from the node A, the node E selects one timeslot for P1 from available timeslots between the node E and the node A, and sends an RR message to the upstream neighboring node A, and the node E selects one timeslot for P1 from available timeslots between the node E and the node F, and sends an SF message to the downstream neighboring node F. Optionally, the node E may further receive an RR message from the downstream neighboring node F.

Specifically, after the node E receives the SF message from the node A, because a timeslot on the link segment A-E is dynamically configured, and the node E is a master node relative to the node A, the node E selects one available timeslot for P1 from the available timeslots between the node E and the node A. A manner in which the node E selects a timeslot is not limited herein. Assuming that each of eight timeslots between the node E and the node A is an idle timeslot, the node E may select a timeslot having a largest number from the eight idle timeslots or may select a timeslot having a smallest number from the eight idle timeslots. Assuming that the node E selects a timeslot 4, the node E needs to send an RR message to the node A. The RR message sent by the node E to the node A includes: a type (RR) of a protection switching request message, a switching object (P1), and an ID of a timeslot that needs to be activated (for example, an ID of the timeslot 4, namely, TS #4). Moreover, the node E uses the timeslot 4 to establish bridging and selection between the node E and the node A. An order of performing two actions in which the node E sends the RR message to the node A and the node E uses the timeslot 4 to establish bridging and selection between the node E and the node A is not limited herein.

Moreover, because the node E is a master node relative to the node F, the node E selects one timeslot for P1 from the available timeslots between the node E and the node F. Assuming that each of eight timeslots between the node E and the node F is an idle timeslot, the node E may select a timeslot having a largest number from the eight idle timeslots, or may select a timeslot having a smallest number from the eight idle timeslots. Assuming that the node E selects a timeslot 2, the node E sends an SF message to the node F. Moreover, the node E uses the timeslot 2 to establish bridging and selection between the node E and the node F. The SF message sent by the node E to the node F includes: a type (SF) of a protection switching request message, a switching object (P1), and an ID of a timeslot that needs to be activated (for example, an ID of the timeslot 2, namely, TS #2).

Alternatively, after determining that the timeslot 2 on E-F is to be used by P1, the node E performs the following actions: (1) sending an SF message to the downstream neighboring node F; (2) replying to the upstream neighboring node A with an RR message; (3) using the timeslot 4 to complete bridging and selection of the node E in directions relative to the node A, for example, bridging 2 and selection 1 shown in FIG. 3; and (4) using the timeslot 2 to complete bridging of the node E in a direction relative to the node F, for example, bridging 1 shown in FIG. 3. In this case, step 4 may be performed or may not be performed, and an order of performing the four actions in step 1, step 2, step 3, and step 4 is not limited. After receiving the RR message sent by the node F, the node E completes the following actions: (5) using the timeslot 2 to complete selection of the node E in a direction relative to the node F, for example, selection 2 shown in FIG. 3; and (6) completing step 4 if step 4 is not completed previously, that is, using the timeslot 2 to complete bridging of the node E in the direction relative to the node F. An order of performing the two actions in step 5 and step 6 is not limited. A difference between this implementation and a previous implementation is that the downstream neighboring node F needs to reply with an RR message, cross-connection of the node E is completed after the node E receives the RR message from the downstream neighboring node F. Compared with the previous implementation, this implementation may prevent an erroneous connection from occurring, thereby improving protection switching reliability.

Node F: After receiving the SF message from the upstream neighboring node E, the node F does not allocate a timeslot to P1, but sends an SF message to the downstream neighboring node G. The node F further receives an RR message sent by the node G. Optionally, the node F may further send an RR message to the upstream neighboring node E.

Specifically, after the node F receives the SF message sent by the node E. and the node F determines that a timeslot resource between the node F and the upstream neighboring node E is available because the node F is a slave node relative to the node E, the node F uses, based on a timeslot ID carried in the SF message sent by the node E, a timeslot 2 to complete bridging and selection in directions between the node F and the node E.

Moreover, because the node F is a slave node relative to the downstream node G, the node F does not allocate a timeslot to P1 and sends an SF message to only the downstream node G. After receiving the SF message sent by the node F and determining that the node G is a master node relative to the node F, the node G allocates a timeslot to P1, adds an ID of the allocated timeslot to an RR message, and returns the RR message to the node F, and the node F receives the RR message sent by the node G, obtains the ID of the timeslot, and then uses the timeslot selected by the node G to establish bridging and selection between the node F and the node G. The SF message sent by the node F to the node G includes but is not limited to: a type (SF) of a protection switching request message and a switching object (P1).

An order of performing two actions in which the node F establishes bridging and selection and the node F sends RR to the node E is not limited.

Node G: After receiving the SF message from the upstream neighboring node F, the node G selects one timeslot for P1 from available timeslots between the node F and the node G and sends an RR message to the node F, and the node G selects one timeslot for P1 from available timeslots between the node G and the node B and sends an SF message to the downstream neighboring node B. Optionally, the node G may further receive an RR message from the downstream neighboring node B.

Specifically, after the node G receives the SF message sent by the node F because the node G is a master node relative to the node F, the node G selects one timeslot for P1 from the available timeslots between the node G and the node F. Assuming that each of eight timeslots between the node G and the node F is an idle timeslot, the node G may select a timeslot having a largest number from the eight idle timeslots, or may select a timeslot having a smallest number from the eight idle timeslots. Assuming that the node G selects a timeslot 2, the node G sends an RR message to the node F. Moreover, the node G uses the timeslot 2 to establish bridging and selection between the node G and the node F. The RR message sent by the node G to the node F includes: a type (RR) of a protection switching request message, a switching object (P1), and an ID of a timeslot that needs to be activated (for example, an ID of the timeslot 2, namely, TS #2). An order of performing two actions in which the node G sends the RR message to the node F and the node G uses the timeslot 2 to establish bridging and selection between the node G and the node F is not limited.

Moreover, because a timeslot on the link segment G-B is dynamically configured, and the node G is a master node relative to the node B, the node G selects one available timeslot for P1 from the available timeslots between the node G and the node B. A manner in which the node G selects a timeslot is not limited herein. Assuming that each of eight timeslots between the node G and the node B is an idle timeslot, the node G may select a timeslot having a largest number from the eight idle timeslots or may select a timeslot having a smallest number from the eight idle timeslots. Assuming that the node G selects a timeslot 4, the node G sends an SF message to the node B. The SF message sent by the node G to the node B includes: a type (SF) of a protection switching request message, a switching object (P1), and an ID of a timeslot that needs to be activated (for example, an ID of the timeslot 4, namely. TS #4). Moreover, the node G uses the timeslot 4 to establish bridging and selection between the node G and the node B.

Alternatively, after determining that the timeslot 4 is to be used by P1, the node G performs the following actions: (1) sending an SF message to the downstream neighboring node B; (2) replying to the upstream neighboring node F with an RR message; (3) using the timeslot 2 to complete bridging and selection of the node G in directions relative to the node F; and (4) using the timeslot 4 to complete bridging of the node G in a direction relative to the node B. In this case, step 4 may be performed or may not be performed, and an order of performing the four actions in step 1, step 2, step 3, and step 4 is not limited. After receiving the RR message sent by the node B, the node G completes the following actions: (5) using the timeslot 4 to complete selection of the node G in a direction relative to the node B; and (6) performing step 4 if step 4 is not performed previously, that is, using the timeslot 4 to complete bridging of the node G in the direction relative to the node B. An order of performing the two actions in step 5 and step 6 is not limited.

Node B: After receiving the SF message from the upstream neighboring node G, the node B establishes a cross-connection between the node B and the node G. Optionally, the node B may further send an RR message to the node G.

Specifically, because a timeslot on a link segment G-B is dynamically configured, and the node B determines, based on the configuration information of the node B, that the node B is a slave node relative to the node G, the node B uses, based on a timeslot ID carried in the SF message sent by the node G, a timeslot 4 to establish selection from G to B and bridging from B to G. Specifically, for the establishing, by the node B, selection from G to B and bridging from B to G, selection may be first established, and then bridging is established; bridging is first established, and then selection is established; or selection and bridging are established simultaneously.

An order of performing two actions in which the node B establishes bridging and selection and the node B sends RR to the node G is not limited.

It should be noted that, if an SF message is sent by a slave node to a master node, after receiving the SF message sent by the slave node, the master node needs to reply with an RR message, and the RR message needs to carry an ID of a timeslot allocated by the master node. If an SF message is sent by a master node to a slave node, after receiving the SF message sent by the master node, the slave node may reply with an RR message, or may not reply with an RR message.

Alternatively, description is given by using an example in which the node A uses the configuration manner in Table 1, the node E uses the configuration manner in Table 11, the node F uses the configuration manner in Table 12, the node G uses the configuration manner in Table 13, and the node B uses the configuration manner in Table 3.

Node A: When the node A detects that the active path S is faulty because the master-slave relationship is not configured for the node A, the node A determines, based on the configuration information of the node A, that P1 needs to occupy the timeslot 1. If the timeslot 1 is available, the node A uses the timeslot 1 to establish bridging and selection between A and E. The node A further sends an SF message to the downstream neighboring node E, and an order of performing two actions in which the node A uses the timeslot 1 to establish bridging and selection between A and E and the node A sends the SF message to the downstream neighboring node E is not limited. In this implementation, after determining that P1 uses the timeslot 1, the node A may use the timeslot 1 to complete establishment of a cross-connection between the node A and the node E. Alternatively, after determining that P1 uses the timeslot 1, the node A performs the following actions: (1) sending an SF message to the downstream neighboring node E; and (2) using the timeslot 1 to complete bridging of the node A in a direction relative to E, for example, bridging 3 shown in FIG. 3. In this case, step 2 may be performed or may not be performed. After receiving the RR message sent by the node E, the node A completes the following actions: (3) using the timeslot 1 to complete selection of the node A in a direction relative to the node E, for example, selection 4 shown in FIG. 3; and (4) performing step 2 if step 2 is not performed previously, that is, using the timeslot 1 to complete bridging of the node A in the direction relative to the node E. A difference between this implementation and a previous implementation is that, cross-connection of the node A is completed after the node A receives the RR message from the downstream neighboring node E. Compared with the previous implementation, this implementation may prevent an erroneous connection from occurring, thereby improving protection switching reliability.

Node E: After the node E receives the SF message sent by the node A because a timeslot on the link segment A-E is preconfigured, the node E determines, based on the configuration information of the node E, that P1 needs to occupy the timeslot 1, and if the node E determines that the timeslot 1 is available, the node E uses the timeslot 1 to complete bridging and selection in directions between the node E and the node A, for example, bridging 2 and selection 1 shown in FIG. 3. Alternatively, if the SF message sent by the node A further includes an ID of a timeslot that needs to be activated, the node E uses, based on a timeslot ID carried in the SF message, a timeslot 1 to complete bridging and selection in directions between the node E and the node A. Optionally, the node E further sends an RR message to the node A. An order of performing two actions in which the node E uses the timeslot 1 to establish selection and bridging between the node E and the node A and the node E sends the RR message to the node A is not limited.

For an operation of the node F, refer to the description corresponding to the node F in the embodiment shown in FIG. 7. Details are not described herein again.

Node G: After the node G receives the SF message sent by the node F, because a timeslot on the link segment G-B is preconfigured, the node G determines, based on the configuration information of the node G, that P1 needs to occupy the timeslot 2, and if the node G determines that the timeslot 2 is available, the node G uses the timeslot 2 to complete bridging and selection in directions between the node G and the node B. Alternatively, after determining that the timeslot 2 is to be used by P, the node G performs the following actions: (1) sending an SF message to the downstream neighboring node B; (2) replying to the upstream neighboring node F with an RR message; (3) using the timeslot 2 to complete bridging and selection of the node G in directions relative to the node F; and (4) using the timeslot 2 to complete bridging of the node G in a direction relative to the node B. In this case, step 4 may be performed or may not be performed, and an order of performing step 1, step 2, step 3, and step 4 is not limited. After receiving the RR message sent by the node B, the node G completes the following actions: (5) using the timeslot 2 to complete selection of the node G in a direction relative to the node B; and (6) performing step 4 if step 4 is not performed previously, that is, using the timeslot 2 to complete bridging of the node G in the direction relative to the node B. An order of performing step 5 and step 6 is not limited. The SF message sent by the node G to the node B includes but is not limited to: a type (SF) of a protection switching request message and a switching object (P1).

Node B: After the node B receives the SF message sent by the node G, because a timeslot on the link segment G-B is preconfigured, the node B determines, based on the configuration information of the node B, that P1 needs to occupy the timeslot 2, and if the node B determines that the timeslot 2 is available, the node B uses the timeslot 2 to establish selection from G to B and bridging from B to G.

In this case, the protection switching process of P1 ends, and the service W1 may be switched to P1 and transmitted. After this, if the node D detects that the active path S2 also is faulty, the node D requests to allocate a timeslot resource to P2. When the node G receives the SF message from the node D, because the node G is a master node relative to the node F, the node G allocates a timeslot to P2. In this case, the node G determines that seven idle timeslots remain in the link F-G, but P2 needs to occupy two timeslots. Therefore, the node G selects the timeslot 7 and the timeslot 8 that are to be used by P2. To be specific, the node G uses the timeslot 7 and the timeslot 8 to establish bridging and selection between the node G and the node F. Moreover, the node G sends an SF message to the node F, and information in the SF message includes but is not limited to: a type (SF) of a protection switching request message, a switching object (P2), and an ID of a timeslot that needs to be activated (for example, an ID of the timeslot 7 and an ID of the timeslot 8, namely, TS #7 and TS #8). When receiving the SF message from the node G, the node F uses the timeslot 7 and the timeslot 8 to establish bridging and selection in directions between the node F and the node G for P2. Moreover, because the node F is a slave node relative to the node E, the node F does not allocate a timeslot to P2 on the link E-F and is responsible for only sending the SF message to the node E. After receiving the SF message from the node F, the node E allocates a timeslot to P2. A manner in which the node E allocates a timeslot is not limited in this embodiment. Assuming that the node E allocates a timeslot 3 and a timeslot 4 to P2 when the node E sends an RR message to the node F, the RR message needs to carry an ID of the timeslot 3 and an ID of the timeslot 4. After receiving the RR message sent by the node E, the node F uses the timeslot 3 and the timeslot 4 to establish bridging and selection relative to the node E. The rest can be deduced by analogy. After all of the timeslots are allocated completely, a preemption scenario is entered, and a timeslot allocation rule of the preemption scenario is described below.

In the protection switching process shown in FIG. 7, when receiving an SF message, any node needs to determine, based on a timeslot resource use situation, whether the switching is ordinary switching or preemption. The determining depends on a timeslot use situation: When remaining timeslots may satisfy requested switching (for example, if four timeslots remain, two timeslots need to be used for protection, and 4>2, the remaining timeslots may satisfy the requested switching), the switching is the ordinary switching; or when remaining timeslots cannot satisfy requested switching (for example, if two timeslots remain, eight timeslots need to be used for protection, and 2<8, the remaining timeslots cannot satisfy the requested switching, and an existing resource needs to be occupied), the switching is the preemption scenario.

In the preemption scenario, when an SF message is sent from a master node (for example, the node E) to a slave node (for example, the node F), the node E determines whether this is a preemption situation. If this is a preemption situation, the node E directly allocates a protection timeslot, sends the SF message including an ID of the allocated timeslot to the node F, and tears down a cross-connection of a preempted service on the node E. When receiving the SF message from the node E (the node F may similarly determine that this is a preemption situation), the node F completes establishment of a cross-connection in the direction from the node F to the node E and sends an RR message to the node E. After receiving the RR message, the node E completes a cross-connection between the node E and the node F. In this case, cross-connection establishment of the node E is completed.

When an SF message is sent from a slave node (for example, the node F) to a master node (for example, the node E), the node F determines whether this is a preemption situation. If this is a preemption situation, the node F finds a service having a lowest priority and preempts the service, tears down cross-connection of the preempted service on the node F, sends an SF message to the node E, and does not perform cross-connection establishment. When the node E receives the SF message from the node F, the node E allocates a timeslot resource to a protection path, sends an RR message including an ID of the allocated timeslot to the node F, and uses the allocated timeslot to modify cross-connection from the node E to the node F. For example, the node E tears down cross-connection established for P1 having a low priority, and uses the set-aside timeslot 1 to establish cross-connection for P2 having a high priority. After receiving the RR message sent by the node E, the node F completes establishment of a cross-connection between the node F and the node E based on the timeslot allocated by the node E. A current cross-connection of a protection path having a low priority on the intermediate node is torn down, so that a protection timeslot resource of the intermediate node is idle, so as to be used by a protection path having a high priority.

Through the implementation of this embodiment of the present invention, when the intermediate node receives an SF message, if the intermediate node is a master node, the intermediate node allocates an available timeslot to the first protection path from the available timeslots, or if the intermediate node is a slave node, the intermediate node sends the SF message to the downstream neighboring node, so that the downstream neighboring node allocates an available timeslot to the first protection path from the available timeslots, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization.

It should be understood that the foregoing embodiments are only examples, and are not intended to limit the scope of the present invention. For example, two or more protection paths may exist, and one intermediate node, a plurality of intermediate nodes, or an end node of a protection path may be shared by a plurality of protection paths. A protection path may need to occupy one or more timeslots, and so on.

Figure 8:
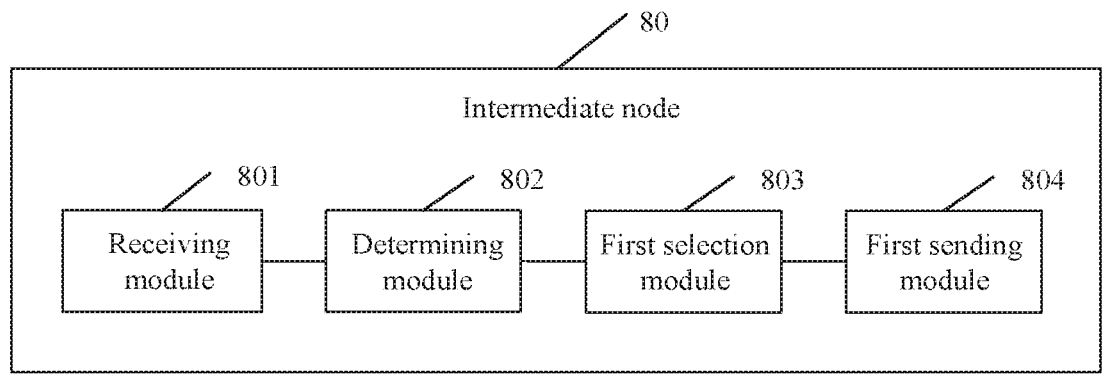
FIG. 8 is a schematic structural diagram of a network node according to an embodiment of the present invention.

FIG. 8 is a schematic structural diagram of a network node according to an embodiment of the present invention. As shown in FIG. 8, an intermediate node 80 includes: a receiving module 801, a determining module 802, a first selection module 803, and a first sending module 804. The intermediate node 80 may be one of a plurality of intermediate nodes on a protection path.

The receiving module 801 is configured to receive a first protection switching request message sent by an upstream neighboring node of the intermediate node, where the first protection switching request message is used to request to activate a first protection path, and the intermediate node is a node on the first protection path.

The determining module 802 is configured to determine that the first protection path needs to occupy N1 timeslots.

The first selection module 803 is configured to select a first group of timeslots for the first protection path from N2 available timeslots in a preset order, where a timeslot quantity of the first group of timeslots is N, the N2 available timeslots are available timeslots included in a link between the intermediate node and a downstream neighboring node of the intermediate node, and N2 is greater than or equal to N1.

The first sending module 804 is configured to send a second protection switching request message to the downstream neighboring node of the intermediate node, where the second protection switching request message is used to request the downstream neighboring node to complete a cross-connection, on the first protection path, between the downstream neighboring node and the intermediate node based on the first group of timeslots.

Optionally, the intermediate node 80 further includes:

a second selection module, configured to: after the receiving module 801 receives the first protection switching request message sent by the upstream neighboring node of the intermediate node, select a second group of timeslots for the first protection path from N3 available timeslots, where a timeslot quantity of the second group of timeslots is N1, the N3 available timeslots are available timeslots included in a link between the intermediate node and the upstream neighboring node of the intermediate node, and N3 is greater than or equal to N1; and a second sending module, configured to send a third protection switching request message to the upstream neighboring node of the intermediate node, where the third protection switching request message is used to request the upstream neighboring node to complete a cross-connection, on the first protection path, between the upstream neighboring node and the intermediate node based on the second group of timeslots.

Optionally, the first protection switching request message is used to request the intermediate node to complete a cross-connection, on the first protection path, between the intermediate node and the upstream neighboring node of the intermediate node based on a second group of timeslots, where the second group of timeslots are available timeslots selected by the upstream neighboring node for the first protection path from N3 available timeslots in a preset order, a timeslot quantity of the second group of timeslots is N1, the N3 available timeslots are available timeslots included in a link between the intermediate node and the upstream neighboring node, and N3 is greater than or equal to N1.

Optionally, the intermediate node 80 further includes:

a processing module, configured to complete the cross-connection between the intermediate node 80 and the downstream neighboring node based on the first group of timeslots, and complete the cross-connection between the intermediate node 80 and the upstream neighboring node based on the second group of timeslots.

Optionally, the first selection module 803 is specifically configured to:

if the intermediate node is a first preset type of node relative to the downstream neighboring node of the intermediate node, select the first group of timeslots for the first protection path from the N2 available timeslots in a first preset order; or if the intermediate node is a second preset type of node relative to the downstream neighboring node of the intermediate node, select the first group of timeslots for the first protection path from the N2 available timeslots in a second preset order, where the first preset order is different from the second preset order.

Optionally, the first preset order is a descending order of timeslot numbers, and the second preset order is an ascending order of the timeslot numbers.

In this embodiment of the present invention, the intermediate node allocates an available timeslot to the first protection path from the available timeslots in the preset order, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

Figure 9:
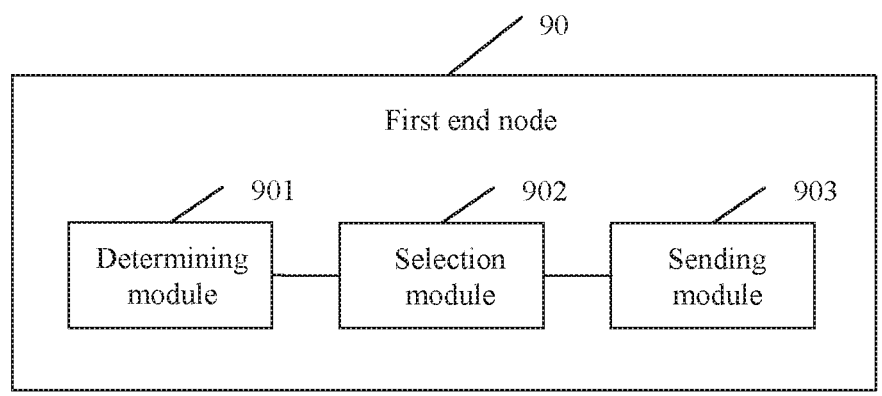
FIG. 9 is a schematic structural diagram of a network node according to an embodiment of the present invention.

FIG. 9 is a schematic structural diagram of a network node according to an embodiment of the present invention. As shown in FIG. 9, a first end node 90 includes: a determining module 901, a selection module 902, and a sending module 903. The first end node 90 may be a common end node of an active path and a protection path.

The determining module 901 is configured to: when a first active path between a first end node and a second end node is faulty, determine that a first protection path needs to occupy N1 timeslots.

The selection module 902 is configured to select a second group of timeslots for the first protection path from N3 available timeslots in a preset order, where the first protection path is a protection path of the first active path, a timeslot quantity of the second group of timeslots is N1, the N3 available timeslots are available timeslots included in a link between the first end node and a downstream neighboring node of the first end node, the downstream neighboring node of the first end node is an intermediate node on the first protection path, and N3 is greater than or equal to N1.

The sending module 903 is configured to send a first protection switching request message to the downstream neighboring node of the first end node, where the first protection switching request message is used to request the downstream neighboring node to complete a cross-connection, on the first protection path, between the downstream neighboring node and the first end node based on the second group of timeslots.

Optionally, the first end node 90 further includes:

a processing module, configured to: after the selection module 902 selects the second group of timeslots for the first protection path from the N3 available timeslots in the preset order, complete the cross-connection between the first end node 90 and the downstream neighboring node based on the second group of timeslots.

Optionally, the selection module 902 is specifically configured to:

if the first end node is a first preset type of node relative to the downstream neighboring node of the first end node, select the second group of timeslots for the first protection path from the N3 available timeslots in a first preset order; or if the first end node is a second preset type of node relative to the downstream neighboring node of the first end node, select the second group of timeslots for the first protection path from the N3 available timeslots in a second preset order, where the first preset order is different from the second preset order.

Optionally, the first preset order is a descending order of timeslot numbers, and the second preset order is an ascending order of the timeslot numbers.

In this embodiment of the present invention, the first end node may select a timeslot used for the first protection path between the first end node and the downstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

Figure 10:
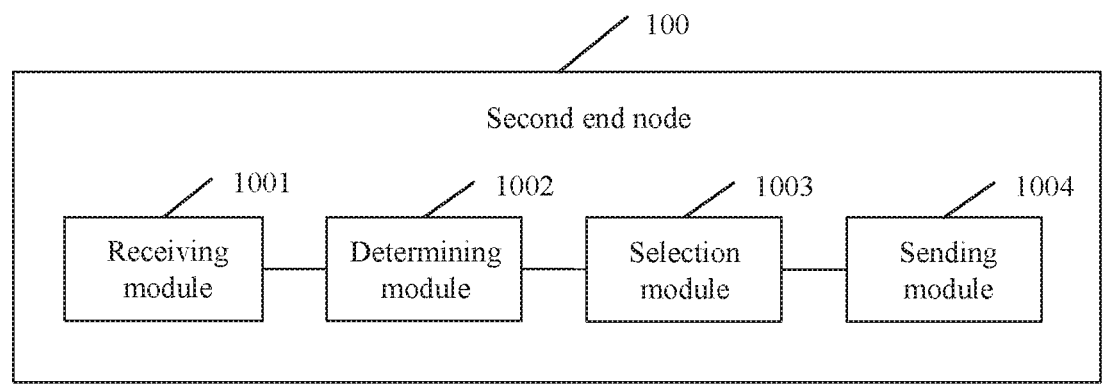
FIG. 10 is a schematic structural diagram of a network node according to an embodiment of the present invention.

FIG. 10 is a schematic structural diagram of a network node according to an embodiment of the present invention. As shown in FIG. 10, a second end node 100 includes: a receiving module 1001, a determining module 1002, a selection module 1003, and a sending module 1004. The second end node 100 may be a common end node of an active path and a protection path.

The receiving module 1001 is configured to receive a fourth protection switching request message sent by an upstream neighboring node of the second end node, where the fourth protection switching request message is used to request to activate a first protection path, and the upstream neighboring node is an intermediate node on the first protection path.

The determining module 1002 is configured to determine that the first protection path needs to occupy N1 timeslots.

The selection module 1003 is configured to select a first group of timeslots for the first protection path from N2 available timeslots, where a timeslot quantity of the first group of timeslots is N1, the N2 available timeslots are available timeslots included in a link between the second end node and the upstream neighboring node of the second end node, and N2 is greater than or equal to N1.

The sending module 1004 is configured to send a fifth protection switching request message to the upstream neighboring node, where the fifth protection switching request message is used to request the upstream neighboring node to complete a cross-connection, on the first protection path, between the upstream neighboring node and the second end node based on the first group of timeslots.

Optionally, the sending module 1004 is specifically configured to:

send the fifth protection switching request message to the upstream neighboring node by using an overhead byte in an optical network.

Optionally, the second end node 100 further includes:

a processing module, configured to: after the selection module 1003 selects the first group of timeslots for the first protection path from the N2 available timeslots, complete the cross-connection between the second end node 100 and the upstream neighboring node based on the first group of timeslots.

In this embodiment of the present invention, the second end node may select a timeslot used for the first protection path between the second end node and the upstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

Figure 11:
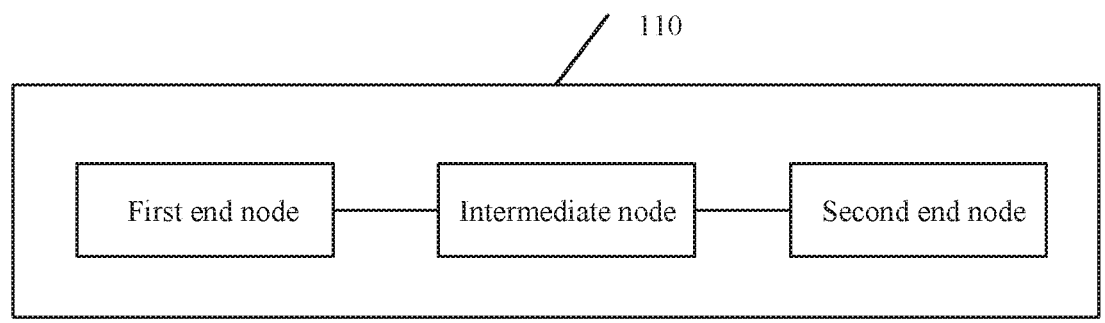
FIG. 11 is a schematic structural diagram of a network system according to an embodiment of the present invention.

FIG. 11 is a schematic structural diagram of a network system according to an embodiment of the present invention. As shown in FIG. 11, the system may include the intermediate node according to the embodiment in FIG. 8 and the first end node according to the embodiment in FIG. 9; may include the intermediate node according to the embodiment in FIG. 8 and the second end node according to the embodiment in FIG. 10; or may include the intermediate node according to the embodiment in FIG. 8, the first end node according to the embodiment in FIG. 9, and the second end node according to the embodiment in FIG. 10.

In this embodiment of the present invention, one or more intermediate nodes may be included.

In a first implementation of this embodiment of the present invention, when a first active path between a first end node and a second end node is faulty, the first end node determines that a first protection path needs to occupy N1 timeslots, and selects a second group of timeslots for the first protection path from N3 available timeslots in a preset order, where the first protection path is a protection path of the first active path, a timeslot quantity of the second group of timeslots is N1, the N3 available timeslots are available timeslots included in a link between the first end node and the intermediate node, the downstream neighboring node of the first end node is the intermediate node on the first protection path, and N3 is greater than or equal to N1;

the first end node sends a first protection switching request message to the intermediate node, where the first protection switching request message is used to request the intermediate node to complete a cross-connection, on the first protection path, between the intermediate node and the first end node based on the second group of timeslots;

the intermediate node receives the first protection switching request message sent by the first end node;

the intermediate node determines that the first protection path needs to occupy N1 timeslots, and selects a first group of timeslots for the first protection path from N2 available timeslots in a preset order, where a timeslot quantity of the first group of timeslots is N1, the N2 available timeslots are available timeslots included in a link between the intermediate node and the second end node, and N2 is greater than or equal to N1;

the intermediate node sends a second protection switching request message to the second end node, where the second protection switching request message is used to request the second end node to complete a cross-connection, on the first protection path, between the second end node and the intermediate node based on the first group of timeslots; and the second end node receives the second protection switching request message sent by the intermediate node and completes the cross-connection between the second end node and the intermediate node based on the second protection switching request message and the first group of timeslots.

Optionally, the first end node completes the cross-connection between the first end node and the intermediate node based on the second group of timeslots.

Optionally, the intermediate node completes the cross-connection between the intermediate node and the first end node based on the first protection switching request message and the second group of timeslots, and completes the cross-connection between the intermediate node and the second end node based on the first group of timeslots.

Optionally, the selecting, by the first end node, a second group of timeslots for the first protection path from N3 available timeslots in a preset order includes:

if the first end node is a first preset type of node relative to the intermediate node, selecting, by the first end node, the second group of timeslots for the first protection path from the N3 available timeslots in a first preset order; or if the first end node is a second preset type of node relative to the intermediate node, selecting, by the first end node, the second group of timeslots for the first protection path from the N3 available timeslots in a second preset order, where the first preset order is different from the second preset order.

Optionally, the selecting, by the intermediate node, a first group of timeslots for the first protection path from N2 available timeslots in a preset order includes:

if the intermediate node is a first preset type of node relative to the second end node, selecting, by the intermediate node, the first group of timeslots for the first protection path from the N2 available timeslots in a first preset order; or if the intermediate node is a second preset type of node relative to the second end node, selecting, by the intermediate node, the first group of timeslots for the first protection path from the N2 available timeslots in a second preset order, where the first preset order is different from the second preset order.

Optionally, the first preset order is a descending order of timeslot numbers, and the second preset order is an ascending order of the timeslot numbers.

In this embodiment of the present invention, the first end node allocates an available timeslot to the first protection path from the available timeslots between the first end node and the intermediate node in a preset order and the intermediate node allocates an available timeslot to the first protection path from the available timeslots between the intermediate node and the second end node in the preset order, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

In a second implementation of this embodiment of the present invention, when a first active path between a first end node and a second end node is faulty, the first end node sends a first protection switching request message to the intermediate node, where the first protection switching request message is used to request to activate a first protection path;

the intermediate node receives the first protection switching request message sent by the first end node;

the intermediate node selects a second group of timeslots for the first protection path from N3 available timeslots, where a timeslot quantity of the second group of timeslots is N1, the N3 available timeslots are available timeslots included in a link between the intermediate node and the first end node, and N3 is greater than or equal to N1:

the intermediate node sends a third protection switching request message to the first end node, where the third protection switching request message is used to request the first end node to complete a cross-connection, on the first protection path, between the first end node and the intermediate node based on the second group of timeslots;

the first end node receives the third protection switching request message sent by the intermediate node, and completes the cross-connection, on the first protection path, between the first end node and the intermediate node based on the third protection switching request message and the second group of timeslots;

the intermediate node selects a first group of timeslots for the first protection path from N2 available timeslots in a preset order, where a timeslot quantity of the first group of timeslots is N1, the N2 available timeslots are available timeslots included in a link between the intermediate node and the second end node, and N2 is greater than or equal to N1; and the intermediate node sends a second protection switching request message to the second end node, where the second protection switching request message is used to request the second end node to complete a cross-connection, on the first protection path, between the second end node and the intermediate node based on the first group of timeslots.

The second end node receives the second protection switching request message sent by the intermediate node, and completes a cross-connection, on the first protection path, between the second end node and the intermediate node based on the second protection switching request message and the first group of timeslots.

Optionally, the intermediate node completes the cross-connection between the intermediate node and the second end node based on the first group of timeslots and completes the cross-connection between the intermediate node and the first end node based on the second group of timeslots.

Optionally, the selecting, by the intermediate node, a first group of timeslots for the first protection path from N2 available timeslots in a preset order includes:

if the intermediate node is a first preset type of node relative to the second end node, selecting, by the intermediate node, the first group of timeslots for the first protection path from the N2 available timeslots in a first preset order; or if the intermediate node is a second preset type of node relative to the second end node, selecting, by the intermediate node, the first group of timeslots for the first protection path from the N2 available timeslots in a second preset order, where the first preset order is different from the second preset order.

Optionally, the first preset order is a descending order of timeslot numbers, and the second preset order is an ascending order of the timeslot numbers.

In this embodiment of the present invention, the intermediate node allocates an available timeslot to the first protection path from the available timeslots between the first end node and the intermediate node, and the intermediate node allocates an available timeslot to the first protection path from the available timeslots between the intermediate node and the second end node in the preset order and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

In a third implementation of this embodiment of the present invention, when a first active path between a first end node and a second end node is faulty, the first end node determines that a first protection path needs to occupy N1 timeslots, and selects a second group of timeslots for the first protection path from N3 available timeslots in a preset order, where the first protection path is a protection path of the first active path, a timeslot quantity of the second group of timeslots is N1, the N3 available timeslots are available timeslots included in a link between the first end node and the intermediate node, the downstream neighboring node of the first end node is the intermediate node on the first protection path, and N3 is greater than or equal to N1;

the first end node sends a first protection switching request message to the intermediate node, where the first protection switching request message is used to request the intermediate node to complete a cross-connection, on the first protection path, between the intermediate node and the first end node based on the second group of timeslots;

the intermediate node receives the first protection switching request message sent by the first end node:

the intermediate node sends a fourth protection switching request message to the second end node, where the fourth protection switching request message is used to request to activate the foregoing first protection path;

the second end node receives the fourth protection switching request message sent by the intermediate node, determines that the first protection path needs to occupy N1 timeslots, and selects a first group of timeslots for the first protection path from N2 available timeslots, where a timeslot quantity of the first group of timeslots is N1, the N2 available timeslots are available timeslots included in a link between the second end node and the intermediate node, and N2 is greater than or equal to N1:

the second end node sends a fifth protection switching request message to the intermediate node, where the fifth protection switching request message is used to request the intermediate node to complete a cross-connection, on the first protection path, between the intermediate node and the second end node based on the first group of timeslots; and the intermediate node receives the fifth protection switching request message sent by the second end node.

Optionally, the intermediate node completes the cross-connection between the intermediate node and the first end node based on the first protection switching request message and the second group of timeslots, and completes the cross-connection between the intermediate node and the second end node based on the fifth protection switching request message and the first group of timeslots.

Optionally, the first end node completes the cross-connection between the first end node and the intermediate node based on the second group of timeslots.

Optionally, the second end node completes the cross-connection between the second end node and the intermediate node based on the first group of timeslots.

Optionally, the selecting, by the first end node, a second group of timeslots for the first protection path from N3 available timeslots in a preset order includes:

if the first end node is a first preset type of node relative to the intermediate node, selecting, by the first end node, the second group of timeslots for the first protection path from the N3 available timeslots in a first preset order; or if the first end node is a second preset type of node relative to the intermediate node, selecting, by the first end node, the second group of timeslots for the first protection path from the N3 available timeslots in a second preset order, where the first preset order is different from the second preset order.

Optionally, the first preset order is a descending order of timeslot numbers, and the second preset order is an ascending order of the timeslot numbers.

In this embodiment of the present invention, the first end node allocates an available timeslot to the first protection path from the available timeslots between the first end node and the intermediate node in a preset order, and the second end node allocates an available timeslot to the first protection path from the available timeslots between the intermediate node and the second end node and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

In a fourth implementation of this embodiment of the present invention, when a first active path between a first end node and a second end node is faulty, the first end node sends a first protection switching request message to the intermediate node, where the first protection switching request message is used to request to activate a first protection path;

the intermediate node receives the first protection switching request message sent by the first end node;

the intermediate node selects a second group of timeslots for the first protection path from N3 available timeslots, where a timeslot quantity of the second group of timeslots is N1, the N3 available timeslots are available timeslots included in a link between the intermediate node and the first end node, and N3 is greater than or equal to N1:

the intermediate node sends a third protection switching request message to the first end node, where the third protection switching request message is used to request the first end node to complete a cross-connection, on the first protection path, between the first end node and the intermediate node based on the second group of timeslots;

the first end node receives the third protection switching request message sent by the intermediate node, and completes the cross-connection, on the first protection path, between the first end node and the intermediate node based on the third protection switching request message and the second group of timeslots;

the intermediate node sends a fourth protection switching request message to the second end node, where the fourth protection switching request message is used to request to activate the foregoing first protection path;

the second end node receives the fourth protection switching request message sent by the intermediate node, determines that the first protection path needs to occupy N1 timeslots, and selects a first group of timeslots for the first protection path from N2 available timeslots, where a timeslot quantity of the first group of timeslots is N1, the N2 available timeslots are available timeslots included in a link between the second end node and the intermediate node, and N2 is greater than or equal to N1;

the second end node sends a fifth protection switching request message to the intermediate node, where the fifth protection switching request message is used to request the intermediate node to complete a cross-connection, on the first protection path, between the intermediate node and the second end node based on the first group of timeslots; and the intermediate node receives the fifth protection switching request message sent by the second end node.

Optionally, the intermediate node completes the cross-connection between the intermediate node and the first end node based on the second group of timeslots, and completes the cross-connection between the intermediate node and the second end node based on the fifth protection switching request message and the first group of timeslots.

Optionally, the second end node completes the cross-connection between the second end node and the intermediate node based on the first group of timeslots.

In this embodiment of the present invention, the intermediate node allocates an available timeslot to the first protection path from the available timeslots between the first end node and the intermediate node, and the second end node allocates an available timeslot to the first protection path from the available timeslots between the intermediate node and the second end node and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

Figure 12:
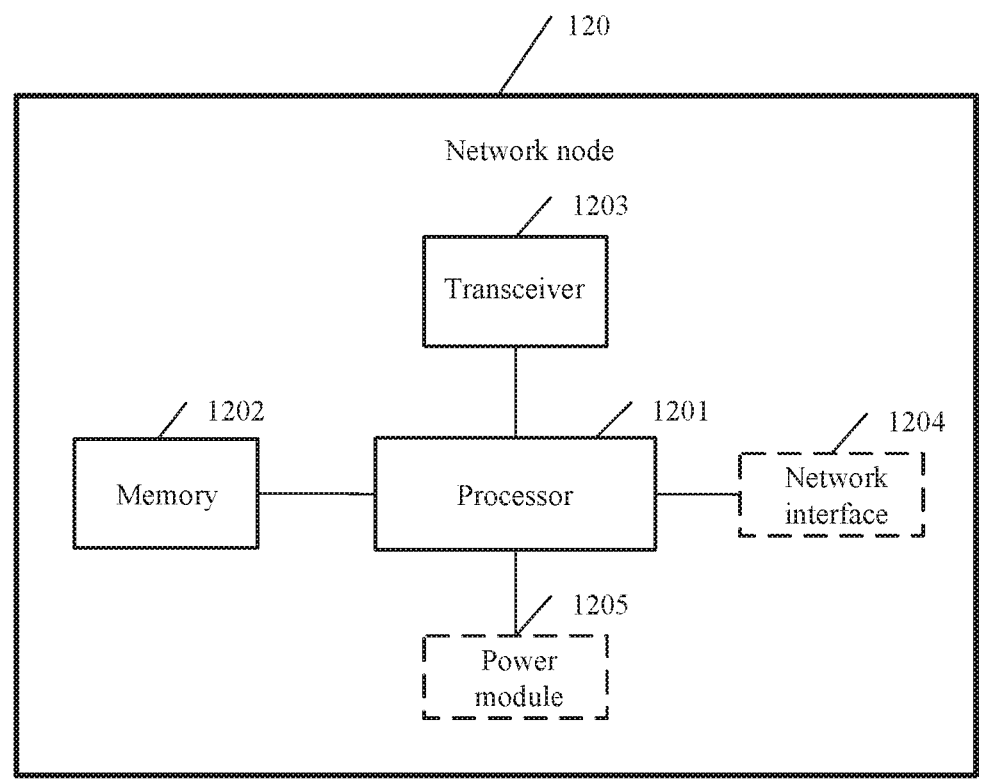
FIG. 12 is a schematic structural diagram of a network node according to an embodiment of the present invention.

FIG. 12 is a schematic structural diagram of a network node according to an embodiment of the present invention. As shown in FIG. 12, the network node 120 includes a processor 1201, a memory 1202, and a transceiver 1203, where the processor 1201, the memory 1202, and the transceiver 1203 may be connected by using a bus or in another manner.

Optionally, the network node 120 may further include a network interface 1204 and a power module 1205.

The memory 1202 is configured to store an instruction. In a specific implementation, a read-only memory (ROM) or a random access memory (RAM) may be used as the memory 1202.

The transceiver 1203 is configured to receive and transmit data.

The network interface 1204 is used by the network node 120 to communicate with another device.

The power module 1205 is configured to supply power to each module of the network node 120.

In a first implementation of this embodiment of the present invention, the processor 1201 is configured to perform the following operations:

receiving, by using the transceiver 1203, a first protection switching request message sent by an upstream neighboring node of the intermediate node, where the first protection switching request message is used to request to activate a first protection path, and the intermediate node is a node on the first protection path;

determining that the first protection path needs to occupy N1 timeslots, and selecting a first group of timeslots for the first protection path from N2 available timeslots in a preset order, where a timeslot quantity of the first group of timeslots is N1, the N2 available timeslots are available timeslots included in a link between the intermediate node and a downstream neighboring node of the intermediate node, and N2 is greater than or equal to N1; and sending, by using the transceiver 1203, a second protection switching request message to the downstream neighboring node of the intermediate node, where the second protection switching request message is used to request the downstream neighboring node to complete a cross-connection, on the first protection path, between the downstream neighboring node and the intermediate node based on the first group of timeslots.

Optionally, after the processor 1201 receives, by using the transceiver 1203, the first protection switching request message sent by the upstream neighboring node of the intermediate node, the processor 1201 is further configured to:

select a second group of timeslots for the first protection path from N3 available timeslots, where a timeslot quantity of the second group of timeslots is N1, the N3 available timeslots are available timeslots included in a link between the intermediate node and the upstream neighboring node of the intermediate node, and N3 is greater than or equal to N1; and send, by using the transceiver 1203, a third protection switching request message to the upstream neighboring node of the intermediate node, where the third protection switching request message is used to request the upstream neighboring node to complete a cross-connection, on the first protection path, between the upstream neighboring node and the intermediate node based on the second group of timeslots.

Optionally, the first protection switching request message is used to request the intermediate node to complete a cross-connection, on the first protection path, between the intermediate node and the upstream neighboring node of the intermediate node based on a second group of timeslots, where the second group of timeslots are available timeslots selected by the upstream neighboring node for the first protection path from N3 available timeslots in a preset order, a timeslot quantity of the second group of timeslots is N1, the N3 available timeslots are available timeslots included in a link between the intermediate node and the upstream neighboring node, and N3 is greater than or equal to N1.

Optionally, the processor 1201 is further configured to:

complete the cross-connection between the intermediate node and the downstream neighboring node based on the first group of timeslots, and complete the cross-connection between the intermediate node and the upstream neighboring node based on the second group of timeslots.

Optionally, the selecting, by the processor 1201, a first group of timeslots for the first protection path from N2 available timeslots in a preset order includes:

if the intermediate node is a first preset type of node relative to the downstream neighboring node of the intermediate node, selecting, by the processor 1201, the first group of timeslots for the first protection path from the N2 available timeslots in a first preset order; or if the intermediate node is a second preset type of node relative to the downstream neighboring node of the intermediate node, selecting, by the processor 1201, the first group of timeslots for the first protection path from the N2 available timeslots in a second preset order, where the first preset order is different from the second preset order.

Optionally, the first preset order is a descending order of timeslot numbers, and the second preset order is an ascending order of the timeslot numbers.

In this embodiment of the present invention, the intermediate node allocates an available timeslot to the first protection path from the available timeslots in the preset order, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

In a second implementation of this embodiment of the present invention, the processor 1201 is configured to perform the following operations:

when a first active path between a first end node and a second end node is faulty, determining that a first protection path needs to occupy N1 timeslots, and selecting a second group of timeslots for the first protection path from N3 available timeslots in a preset order, where the first protection path is a protection path of the first active path, a timeslot quantity of the second group of timeslots is N1, the N3 available timeslots are available timeslots included in a link between the first end node and a downstream neighboring node of the first end node, the downstream neighboring node of the first end node is the intermediate node on the first protection path, and N3 is greater than or equal to N1; and sending, by using the transceiver 1203, a first protection switching request message to the downstream neighboring node of the first end node, where the first protection switching request message is used to request the downstream neighboring node to complete a cross-connection, on the first protection path, between the downstream neighboring node and the first end node based on the second group of timeslots.

Optionally, after the processor 1201 selects the second group of timeslots for the first protection path from the N3 available timeslots in the preset order, the processor 1201 is further configured to:

complete the cross-connection between the first end node and the downstream neighboring node based on the second group of timeslots.

Optionally, the selecting, by the processor 1201, a second group of timeslots for the first protection path from N3 available timeslots in a preset order includes:

if the first end node is a first preset type of node relative to the downstream neighboring node of the first end node, selecting, by the processor 1201, the second group of timeslots for the first protection path from the N3 available timeslots in a first preset order; or if the first end node is a second preset type of node relative to the downstream neighboring node of the first end node, selecting, by the processor 1201, the second group of timeslots for the first protection path from the N3 available timeslots in a second preset order, where the first preset order is different from the second preset order.

Optionally, the first preset order is a descending order of timeslot numbers, and the second preset order is an ascending order of the timeslot numbers.

In this embodiment of the present invention, the first end node may select a timeslot used for the first protection path between the first end node and the downstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

In a third implementation of this embodiment of the present invention, the processor 1201 is configured to perform the following operations:

receiving, by using the transceiver 1203, a fourth protection switching request message sent by an upstream neighboring node of the second end node, where the fourth protection switching request message is used to request to activate a first protection path, and the upstream neighboring node is an intermediate node on the first protection path;

determining that the first protection path needs to occupy N1 timeslots, and selecting a first group of timeslots for the first protection path from N2 available timeslots, where a timeslot quantity of the first group of timeslots is N1, the N2 available timeslots are available timeslots included in a link between the second end node and the upstream neighboring node of the second end node, and N2 is greater than or equal to N1; and sending, by using the transceiver 1203, a fifth protection switching request message to the upstream neighboring node, where the fifth protection switching request message is used to request the upstream neighboring node to complete a cross-connection, on the first protection path, between the upstream neighboring node and the second end node based on the first group of timeslots.

Optionally, the sending, by the processor 1201 by using the transceiver 1203, a fifth protection switching request message to the upstream neighboring node includes:

sending, by the processor 1201 by using the transceiver 1203, the fifth protection switching request message to the upstream neighboring node by using an overhead byte in an optical network.

Optionally, after the processor 1201 selects the first group of timeslots for the first protection path from the N2 available timeslots, the processor 1201 is further configured to:

complete the cross-connection between the second end node and the upstream neighboring node based on the first group of timeslots.

In this embodiment of the present invention, the second end node may select a timeslot used for the first protection path between the second end node and the upstream neighboring node, and does not need to allocate a timeslot to the first protection path based on a preconfiguration. When each of a plurality of active paths sharing a same timeslot resource is faulty, a problem that a service having a low priority is interrupted because the service cannot obtain a timeslot resource is avoided, thereby improving timeslot resource utilization, and further improving protection switching efficiency.

A person of ordinary skill in the art may understand that each aspect of the present invention or a possible implementation of each aspect may be specifically implemented as a system, a method, or a computer program product. Therefore, each aspect of the present invention or a possible implementation of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation of each aspect may take a form of a computer program product, where the computer program product refers to computer-readable program code stored in a computer-readable medium.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

What is claimed is:

1. A protection switching method, comprising:
selecting, by a node, a group of N timeslots to be occupied by a protection path from among M available timeslots based on (1) the node being set to be responsible for timeslot allocation between the node and a neighboring node of the node and (2) the neighboring node being set to not be responsible for timeslot allocation between the node and the neighboring node, wherein the node is a node on the protection path, the M available timeslots are available timeslots in a shared link segment between the node and the neighboring node, and M is greater than or equal to N; and sending, by the node, a first protection switching request message to the neighboring node, wherein the first protection switching request message requests the neighboring node to complete a cross-connection, on the protection path, between the neighboring node and the node based on the group of N timeslots.

2. The method according to claim 1, wherein the method further comprises:
receiving, by the node, a second protection switching request message sent by an upstream neighboring node of the node, wherein the second protection switching request message requests to activate the protection path.

3. The method according to claim 2, wherein the second protection switching request message requests the node to complete a cross-connection, on the protection path, between the node and the upstream neighboring node of the node based on a second group of N timeslots, wherein the second group of N timeslots are available timeslots selected by the upstream neighboring node for the protection path from among M2 available timeslots, the M2 available timeslots are available timeslots in a shared link segment between the node and the upstream neighboring node, and M2 is greater than or equal to N.

4. The method according to claim 1, wherein the neighboring node of the node comprises at least one of a downstream neighboring node of the node or an upstream neighboring node of the node.

5. The method according to claim 4, wherein the selecting, by the node, a group of N timeslots to be occupied by the protection path from among M available timeslots comprises:
selecting, by the node, a first group of N timeslots to be occupied by the protection path from among M1 available timeslots based on (1) the node being set to be responsible for timeslot allocation between the node and the downstream neighboring node and (2) the downstream neighboring node being set to not be responsible for timeslot allocation between the node and the downstream neighboring node, wherein the M1 available timeslots are available timeslots in a shared link segment between the node and the downstream neighboring node, and M1 is greater than or equal to N; and
sending, by the node, a third protection switching request message to the downstream neighboring node, wherein the third protection switching request message requests the downstream neighboring node to complete a cross-connection, on the protection path, between the downstream neighboring node and the node based on the first group of N timeslots.

6. The method according to claim 5, further comprising:
completing, by the node, the cross-connection between the node and the downstream neighboring node based on the first group of N timeslots.

7. The method according to claim 4, wherein the selecting, by the node, a group of N timeslots to be occupied by the protection path from among M available timeslots comprises:
selecting, by the node, a second group of N timeslots to be occupied by the protection path from among M2 available timeslots based on (1) the node being set to be responsible for timeslot allocation between the node and the upstream neighboring node and (2) the upstream neighboring node being set to not be responsible for timeslot allocation between the node and the upstream neighboring node, wherein the M2 available timeslots are available timeslots in a shared link segment between the node and the upstream neighboring node, and M2 is greater than or equal to N; and
sending, by the node, a fourth protection switching request message to the upstream neighboring node, wherein the fourth protection switching request message requests the upstream neighboring node to complete a cross-connection, on the protection path, between the upstream neighboring node and the node based on the second group of N timeslots.

8. The method according to claim 7, further comprising:
completing, by the node, the cross-connection between the node and the upstream neighboring node based on the second group of N timeslots.

9. The method according to claim 1, further comprising:
completing, by the node, the cross-connection between the node and the neighboring node based on the group of N timeslots.

10. A node, comprising:
at least one processor; and
a non-transitory computer readable medium coupled to the at least one processor and storing a plurality of computer executable instructions that, when executed by the at least one processor, cause the at least one processor to:
select a group of N timeslots to be occupied by a protection path from among M available timeslots based on (1) the node being set to be responsible for timeslot allocation between the node and a neighboring node of the node and (2) the neighboring node being set to not be responsible for timeslot allocation between the node and the neighboring node, wherein the node is a node on the protection path, the M available timeslots are available timeslots in a shared link segment between the node and the neighboring node, and M is greater than or equal to N; and
send a first protection switching request message to the neighboring node, wherein the first protection switching request message requests the neighboring node to complete a cross-connection, on the protection path, between the neighboring node and the node based on the group of N timeslots.

11. The node according to claim 10, wherein the plurality of computer executable instructions, when executed by the at least one processor, cause the at least one processor to:
receive a second protection switching request message sent by an upstream neighboring node of the node, wherein the second protection switching request message requests to activate the protection path.

12. The node according to claim 11, wherein the second protection switching request message requests the node to complete a cross-connection, on the protection path, between the node and the upstream neighboring node of the node based on a second group of N timeslots, wherein the second group N of timeslots are available timeslots selected by the upstream neighboring node for the protection path from among M2 available timeslots, the M2 available timeslots are available timeslots in a shared link segment between the node and the upstream neighboring node, and M2 is greater than or equal to N.

13. The node according to claim 10, wherein the neighboring node comprises at least one of a downstream neighboring node of the node or an upstream neighboring node of the node.

14. The node according to claim 13, wherein the plurality of computer executable instructions, when executed by the at least one processor, cause the at least one processor to:

select a first group of N timeslots to be occupied by the protection path from among M1 available timeslots based on (1) the node being set to be responsible for timeslot allocation between the node and the downstream neighboring node and (2) the downstream neighboring node being set to not be responsible for timeslot allocation between the node and the downstream neighboring node, wherein the M1 available timeslots are available timeslots in a shared link segment between the node and the downstream neighboring node, and M1 is greater than or equal to N; and send a third protection switching request message to the downstream neighboring node, wherein the third protection switching request message requests the downstream neighboring node to complete a cross-connection, on the protection path, between the downstream neighboring node and the node based on the first group of N timeslots.

15. The node according to claim 14, wherein the plurality of computer executable instructions, when executed by the at least one processor, cause the at least one processor:

complete the cross-connection between the node and the downstream neighboring node based on the first group of N timeslots.

16. The node according to claim 13, wherein the plurality of computer executable instructions, when executed by the at least one processor, cause the at least one processor to:

select a second group of N timeslots to be occupied by the protection path from among M2 available timeslots based on (1) the node being set to be responsible for timeslot allocation between the node and the upstream neighboring node and (2) the upstream neighboring node being set to not be responsible for timeslot allocation between the node and the upstream neighboring node, wherein the M2 available timeslots are available timeslots in a shared link segment between the node and the upstream neighboring node, and M2 is greater than or equal to N; and send a fourth protection switching request message to the upstream neighboring node, wherein the fourth protection switching request message requests the upstream neighboring node to complete a cross-connection, on the protection path, between the upstream neighboring node and the node based on the second group of N timeslots.

17. The node according to claim 16, wherein the plurality of computer executable instructions, when executed by the at least one processor, cause the at least one processor:

complete the cross-connection between the node and the upstream neighboring node based on the second group of N timeslots.

18. The node according to claim 10, wherein the plurality of computer executable instructions, when executed by the at least one processor, cause the at least one processor to:

complete the cross-connection between the node and the neighboring node based on the group of N timeslots.

* * * * *